United States Patent
Krzych et al.

(10) Patent No.: US 10,524,083 B2
(45) Date of Patent: *Dec. 31, 2019

(54) SYSTEM AND METHOD FOR LOW POWER DATA ROUTING

(71) Applicant: Estimote Polska Sp. z o. o., Cracow (PL)

(72) Inventors: Jakub Krzych, Cracow (PL); Lukasz Kostka, Cracow (PL)

(73) Assignee: Estimote Polska Sp z o.o., Cracow (PL)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,254

(22) Filed: Oct. 4, 2018

(65) Prior Publication Data

US 2019/0037341 A1    Jan. 31, 2019

Related U.S. Application Data

(63) Continuation of application No. 15/997,567, filed on Jun. 4, 2018, now Pat. No. 10,136,250, which is a
(Continued)

(51) Int. Cl.
*H04W 24/00* (2009.01)
*H04W 4/02* (2018.01)
(Continued)

(52) U.S. Cl.
CPC .............. *H04W 4/02* (2013.01); *G01S 5/02* (2013.01); *G01S 5/0226* (2013.01);
(Continued)

(58) Field of Classification Search
CPC ...... H04B 17/318; H04W 4/02; H04W 4/027; H04W 84/18; H04W 52/322; H04W 4/50; H04W 64/00; H04W 4/021; H04W 4/008; H04L 12/717; H05B 37/02; G01S 5/02; G01S 5/0252; G01S 5/0294; Y02D 70/144; Y02D 70/22
(Continued)

(56) References Cited

U.S. PATENT DOCUMENTS 6,091,358 A    7/2000    Maniscalco et al.
6,362,778 B2    3/2002    Neher
(Continued)

FOREIGN PATENT DOCUMENTS

AU    2016101053 A4    8/2016
CN    201479382 U  *  5/2010
(Continued)

OTHER PUBLICATIONS

Jung, Chansu, et al.; "Maximum Power Plus RSSI Based Routing Protocol for Bluetooth Low Energy Ad Hoc Networks", Wireless Communications and Mobile Computing, Dec. 13, 2017, 1-13.

*Primary Examiner* — Mahendra R Patel
(74) *Attorney, Agent, or Firm* — Jeffrey Schox; Diana Lin

(57) ABSTRACT

A system for data routing includes a set of beacons, an object, and a data routing system. A method for data routing can include: generating a routing table, determining a data routing path based on the routing table, and routing data to an endpoint based on the data routing path.

17 Claims, 7 Drawing Sheets

Related U.S. Application Data continuation-in-part of application No. 15/900,171, filed on Feb. 20, 2018, now abandoned, which is a continuation of application No. 15/784,774, filed on Oct. 16, 2017, now Pat. No. 9,942,706, which is a continuation of application No. 15/590,939, filed on May 9, 2017, now Pat. No. 9,826,351, which is a continuation-in-part of application No. 15/446,165, filed on Mar. 1, 2017, now Pat. No. 9,826,356, which is a continuation of application No. 15/253,376, filed on Aug. 31, 2016, now Pat. No. 9,622,208.

(60) Provisional application No. 62/514,110, filed on Jun. 2, 2017, provisional application No. 62/334,115, filed on May 10, 2016, provisional application No. 62/416,395, filed on Nov. 2, 2016, provisional application No. 62/213,467, filed on Sep. 2, 2015.

(51) Int. Cl.

| | | |
|---|---|---|
| *H04B 17/318* | (2015.01) | |
| *H04W 64/00* | (2009.01) | |
| *H04W 52/32* | (2009.01) | |
| *H04W 4/021* | (2018.01) | |
| *G01S 5/02* | (2010.01) | |
| *H04B 17/27* | (2015.01) | |
| *H04W 4/50* | (2018.01) | |
| *H04W 84/18* | (2009.01) | |

(52) U.S. Cl.
CPC .......... *G01S 5/0252* (2013.01); *G01S 5/0294* (2013.01); *H04B 17/27* (2015.01); *H04B 17/318* (2015.01); *H04W 4/021* (2013.01); *H04W 4/027* (2013.01); *H04W 4/50* (2018.02); *H04W 52/322* (2013.01); *H04W 64/00* (2013.01); *H04W 84/18* (2013.01)

(58) Field of Classification Search
USPC ..... 455/456.1, 41.2, 445; 340/10.2; 370/352
See application file for complete search history.

(56) References Cited

U.S. PATENT DOCUMENTS

| | | |
|---|---|---|
| 6,775,258 B1 | 8/2004 | Van et al. |
| 6,873,258 B2 | 3/2005 | Marples et al. |
| 6,965,575 B2 | 11/2005 | Srikrishna et al. |
| 7,027,808 B2 | 4/2006 | Wesby |
| 7,038,584 B2 | 5/2006 | Carter |
| 7,072,671 B2 | 7/2006 | Leitch |
| 7,283,846 B2 | 10/2007 | Spriestersbach et al. |
| 7,312,752 B2 | 12/2007 | Smith et al. |
| 7,366,113 B1 * | 4/2008 | Chandra ................ H04L 41/12 370/255 |
| 7,458,825 B2 | 12/2008 | Atsmon et al. |
| 7,499,462 B2 | 3/2009 | MacMullan et al. |
| 7,564,812 B1 | 7/2009 | Elliott |
| 7,639,131 B2 | 12/2009 | Mock et al. |
| 7,683,761 B2 * | 3/2010 | Burghard ............ H04W 40/248 340/10.2 |
| 7,705,728 B2 | 4/2010 | Mock et al. |
| 7,706,282 B2 | 4/2010 | Huang |
| 7,835,505 B2 | 11/2010 | Toyama et al. |
| 7,855,679 B1 | 12/2010 | Braiman |
| 7,865,306 B2 | 1/2011 | Mays |
| 7,983,677 B2 | 7/2011 | Dacosta |
| 8,058,988 B1 | 11/2011 | Medina et al. |
| 8,139,945 B1 | 3/2012 | Amir et al. |
| 8,160,056 B2 * | 4/2012 | Van der Merwe ...... H04L 45/04 370/351 |
| 8,260,320 B2 | 9/2012 | Herz |
| 8,265,621 B2 | 9/2012 | Kopikare et al. |
| 8,489,112 B2 | 7/2013 | Roeding et al. |
| 8,520,648 B2 | 8/2013 | Cordeiro |
| 8,559,975 B2 | 10/2013 | Basu et al. |
| 8,594,850 B1 | 11/2013 | Gourlay et al. |
| 8,612,604 B2 | 12/2013 | Beatty et al. |
| 8,644,255 B1 | 2/2014 | Burcham et al. |
| 8,694,060 B2 | 4/2014 | Vanderaa et al. |
| 8,694,782 B2 | 4/2014 | Lambert |
| 8,723,720 B2 | 5/2014 | Moffatt et al. |
| 8,781,502 B1 | 7/2014 | Middleton et al. |
| 8,791,901 B2 | 7/2014 | Mallinson |
| 8,797,214 B2 | 8/2014 | Taylor et al. |
| 8,844,007 B2 | 9/2014 | Vicente et al. |
| 8,847,754 B2 * | 9/2014 | Buchheim ................ G01S 1/68 340/539.13 |
| 8,855,922 B1 | 10/2014 | Starenky et al. |
| 8,867,993 B1 | 10/2014 | Perkins et al. |
| 8,868,133 B1 * | 10/2014 | Rosenbaum .......... H04W 4/026 455/562.1 |
| 8,896,485 B2 | 11/2014 | Mendelson |
| 8,911,932 B2 | 12/2014 | Sun |
| 8,934,389 B2 | 1/2015 | Kuehnel et al. |
| 8,938,196 B2 | 1/2015 | Bradish et al. |
| 8,965,398 B2 * | 2/2015 | Zhu ....................... H04W 24/00 370/338 |
| 8,971,850 B2 | 3/2015 | Klein et al. |
| 8,971,932 B2 | 3/2015 | Mapes |
| 8,988,221 B2 | 3/2015 | Raji et al. |
| 8,996,030 B2 | 3/2015 | Grainger et al. |
| 9,014,715 B2 | 4/2015 | Alizadeh-Shabdiz et al. |
| 9,026,134 B2 | 5/2015 | Edge |
| 9,033,255 B2 | 5/2015 | Tessier et al. |
| 9,036,792 B2 | 5/2015 | Cacioppo et al. |
| 9,063,212 B2 | 6/2015 | Jones |
| 9,113,309 B2 | 8/2015 | Uilecan et al. |
| 9,113,343 B2 | 8/2015 | Moshfeghi |
| 9,140,796 B2 | 9/2015 | Zhou |
| 9,143,890 B2 | 9/2015 | Jose et al. |
| 9,154,565 B2 | 10/2015 | Monighetti |
| 9,202,245 B2 | 12/2015 | Kostka et al. |
| 9,258,674 B2 | 2/2016 | Chen |
| 9,282,436 B2 | 3/2016 | Chitre et al. |
| 9,282,582 B1 * | 3/2016 | Dunsbergen .......... H04W 48/12 |
| 9,307,355 B2 | 4/2016 | Nehrenz et al. |
| 9,351,114 B2 | 5/2016 | Chatterjee et al. |
| 9,361,630 B1 | 6/2016 | Goswami |
| 9,398,422 B2 | 7/2016 | Zampini |
| 9,408,060 B2 | 8/2016 | Helms et al. |
| 9,424,699 B2 | 8/2016 | Kusens et al. |
| 9,445,305 B2 | 9/2016 | Lyon et al. |
| 9,471,917 B2 | 10/2016 | Govindarajan et al. |
| 9,474,962 B2 | 10/2016 | Barney et al. |
| 9,491,575 B2 | 11/2016 | Edge et al. |
| 9,551,774 B2 | 1/2017 | Ishida et al. |
| 9,558,507 B2 | 1/2017 | Zilkha |
| 9,571,957 B2 | 2/2017 | Granbery |
| 9,591,570 B2 | 3/2017 | Kubo et al. |
| 9,608,999 B2 | 3/2017 | Somani et al. |
| 9,609,487 B2 * | 3/2017 | Alshihi ................ H04W 4/043 |
| 9,621,446 B2 | 4/2017 | Pugh et al. |
| 9,622,046 B2 | 4/2017 | Otis et al. |
| 9,622,208 B2 | 4/2017 | Mycek et al. |
| 9,629,064 B2 | 4/2017 | Graves et al. |
| 9,634,928 B2 | 4/2017 | Choudhury et al. |
| 9,642,173 B2 | 5/2017 | Granbery |
| 9,648,662 B2 | 5/2017 | Herrala et al. |
| 9,652,124 B2 | 5/2017 | Cotier et al. |
| 9,684,826 B2 | 6/2017 | Dubuque |
| 9,684,925 B2 | 6/2017 | Khalid et al. |
| 9,689,955 B2 | 6/2017 | Rosenbaum |
| 9,922,294 B2 | 3/2018 | Raina et al. |
| 9,998,867 B2 | 6/2018 | Keithley |
| 2001/0026240 A1 | 10/2001 | Neher |
| 2002/0167919 A1 | 11/2002 | Marples et al. |
| 2003/0084539 A1 | 5/2003 | Wartian |
| 2003/0100315 A1 | 5/2003 | Rankin |
| 2003/0148775 A1 | 8/2003 | Spriestersbach et al. |
| 2004/0008663 A1 | 1/2004 | Srikrishna et al. |
| 2004/0190447 A1 * | 9/2004 | Dacosta ................ H04L 45/00 370/229 |

(56) References Cited

U.S. PATENT DOCUMENTS

| | | | |
|---|---|---|---|
| 2004/0264372 A1* | 12/2004 | Huang | H04L 45/00 370/230 |
| 2004/0264466 A1 | 12/2004 | Huang | |
| 2005/0162271 A1 | 7/2005 | Leitch | |
| 2005/0222933 A1 | 10/2005 | Wesby | |
| 2006/0163349 A1 | 7/2006 | Neugebauer | |
| 2006/0164213 A1* | 7/2006 | Burghard | H04W 40/248 340/10.2 |
| 2006/0209745 A1 | 9/2006 | MacMullan et al. | |
| 2006/0259942 A1 | 11/2006 | Toyama et al. | |
| 2006/0290519 A1 | 12/2006 | Boate et al. | |
| 2007/0067104 A1* | 3/2007 | Mays | G01C 21/36 701/437 |
| 2007/0069923 A1 | 3/2007 | Mendelson | |
| 2007/0243769 A1 | 10/2007 | Atsmon et al. | |
| 2007/0247366 A1 | 10/2007 | Smith et al. | |
| 2008/0056215 A1 | 3/2008 | Kopikare et al. | |
| 2008/0062891 A1* | 3/2008 | Van der Merwe | H04L 45/04 370/254 |
| 2008/0068519 A1 | 3/2008 | Adler et al. | |
| 2008/0139306 A1 | 6/2008 | Lutnick et al. | |
| 2008/0143516 A1 | 6/2008 | Mock et al. | |
| 2008/0143604 A1 | 6/2008 | Mock et al. | |
| 2008/0231460 A1 | 9/2008 | Owen et al. | |
| 2009/0005079 A1 | 1/2009 | Shields et al. | |
| 2009/0009398 A1 | 1/2009 | Taylor et al. | |
| 2009/0131079 A1 | 5/2009 | Sekhar | |
| 2009/0311976 A1 | 12/2009 | Vanderaa et al. | |
| 2009/0327135 A1 | 12/2009 | Nguyen et al. | |
| 2010/0019924 A1 | 1/2010 | D et al. | |
| 2010/0093374 A1 | 4/2010 | Dacosta | |
| 2010/0099435 A1 | 4/2010 | Druzinic-Fiebach et al. | |
| 2010/0100582 A1 | 4/2010 | Beatty et al. | |
| 2010/0105353 A1 | 4/2010 | Cacioppo et al. | |
| 2010/0120450 A1 | 5/2010 | Herz | |
| 2010/0168924 A1 | 7/2010 | Tessier et al. | |
| 2010/0317371 A1 | 12/2010 | Migos et al. | |
| 2011/0028160 A1 | 2/2011 | Roeding et al. | |
| 2011/0029359 A1 | 2/2011 | Roeding et al. | |
| 2011/0085442 A1* | 4/2011 | Lin | H04L 45/42 370/235 |
| 2011/0102171 A1 | 5/2011 | Raji et al. | |
| 2011/0238188 A1 | 9/2011 | Washiro | |
| 2011/0305228 A1 | 12/2011 | Cordeiro | |
| 2011/0306357 A1 | 12/2011 | Alizadeh-Shabdiz et al. | |
| 2012/0032876 A1* | 2/2012 | Tabe | H04B 1/3838 345/156 |
| 2012/0057518 A1* | 3/2012 | Herrala | H04W 84/20 370/315 |
| 2012/0095805 A1 | 4/2012 | Ghosh et al. | |
| 2012/0112055 A1 | 5/2012 | Castro-Perez et al. | |
| 2012/0172055 A1 | 7/2012 | Edge | |
| 2012/0190386 A1 | 7/2012 | Anderson | |
| 2012/0258730 A1 | 10/2012 | Tinnakornsrisuphap et al. | |
| 2012/0260323 A1 | 10/2012 | San Vicente et al. | |
| 2012/0280862 A1 | 11/2012 | Moffatt et al. | |
| 2012/0284517 A1 | 11/2012 | Lambert | |
| 2012/0295535 A1 | 11/2012 | Bradish et al. | |
| 2012/0309256 A1 | 12/2012 | Theodore | |
| 2012/0316960 A1 | 12/2012 | Yang | |
| 2012/0320815 A1 | 12/2012 | Massena | |
| 2013/0023282 A1 | 1/2013 | Lin et al. | |
| 2013/0030915 A1 | 1/2013 | Statler et al. | |
| 2013/0063303 A1 | 3/2013 | Zhou | |
| 2013/0065584 A1 | 3/2013 | Lyon et al. | |
| 2013/0165157 A1 | 6/2013 | Mapes | |
| 2013/0182625 A1 | 7/2013 | Kuehnel et al. | |
| 2013/0184002 A1 | 7/2013 | Moshfeghi | |
| 2013/0203445 A1 | 8/2013 | Grainger et al. | |
| 2013/0217332 A1* | 8/2013 | Altman | H04H 60/90 455/41.2 |
| 2013/0225197 A1 | 8/2013 | McGregor et al. | |
| 2013/0337771 A1 | 12/2013 | Klein et al. | |
| 2014/0004865 A1* | 1/2014 | Bhargava | H04W 74/0816 455/445 |
| 2014/0018002 A1* | 1/2014 | Jose | H04W 4/80 455/41.2 |
| 2014/0087758 A1 | 3/2014 | Maor | |
| 2014/0106782 A1 | 4/2014 | Chitre et al. | |
| 2014/0122703 A1 | 5/2014 | Pugh et al. | |
| 2014/0122855 A1 | 5/2014 | Maneval | |
| 2014/0135042 A1* | 5/2014 | Buchheim | G01S 1/68 455/456.6 |
| 2014/0148196 A1* | 5/2014 | Bassan-Eskenazi | G06K 7/10297 455/456.1 |
| 2014/0149577 A1 | 5/2014 | Monighetti | |
| 2014/0180817 A1 | 6/2014 | Zilkha | |
| 2014/0219118 A1 | 8/2014 | Middleton et al. | |
| 2014/0220883 A1 | 8/2014 | Emigh et al. | |
| 2014/0228044 A1 | 8/2014 | Jones | |
| 2014/0277654 A1* | 9/2014 | Reinhardt | G06F 3/165 700/94 |
| 2014/0302869 A1 | 10/2014 | Rosenbaum et al. | |
| 2015/0005011 A1 | 1/2015 | Nehrenz et al. | |
| 2015/0031388 A1 | 1/2015 | Chatterjee et al. | |
| 2015/0038171 A1 | 2/2015 | Uilecan et al. | |
| 2015/0058355 A1 | 2/2015 | Naqvi | |
| 2015/0081474 A1* | 3/2015 | Kostka | H04W 4/21 705/26.8 |
| 2015/0094140 A1 | 4/2015 | Barney et al. | |
| 2015/0106196 A1 | 4/2015 | Williams et al. | |
| 2015/0163828 A1 | 6/2015 | Vandwalle et al. | |
| 2015/0248667 A1 | 9/2015 | Govindarajan et al. | |
| 2015/0276432 A1 | 10/2015 | Repyevsky et al. | |
| 2015/0279115 A1 | 10/2015 | Vukicevic | |
| 2015/0289207 A1 | 10/2015 | Kubo et al. | |
| 2015/0294398 A1 | 10/2015 | Khalid et al. | |
| 2015/0295333 A1 | 10/2015 | Shibuya et al. | |
| 2015/0296048 A1 | 10/2015 | Gerding et al. | |
| 2015/0296333 A1 | 10/2015 | Chen | |
| 2015/0334548 A1 | 11/2015 | Liu et al. | |
| 2015/0347959 A1 | 12/2015 | Skaaksrud | |
| 2015/0351008 A1 | 12/2015 | Mayor | |
| 2015/0355308 A1 | 12/2015 | Ishida et al. | |
| 2015/0365790 A1* | 12/2015 | Edge | H04W 4/90 455/404.2 |
| 2015/0379576 A1 | 12/2015 | Otis et al. | |
| 2015/0382153 A1 | 12/2015 | Otis et al. | |
| 2016/0006837 A1 | 1/2016 | Reynolds et al. | |
| 2016/0007315 A1 | 1/2016 | Lundgreen et al. | |
| 2016/0014609 A1 | 1/2016 | Goel et al. | |
| 2016/0021687 A1 | 1/2016 | Granbery | |
| 2016/0042767 A1 | 2/2016 | Araya et al. | |
| 2016/0049028 A1 | 2/2016 | Kusens et al. | |
| 2016/0055428 A1 | 2/2016 | Raina et al. | |
| 2016/0063550 A1 | 3/2016 | Caldwell | |
| 2016/0086029 A1 | 3/2016 | Dubuque | |
| 2016/0086460 A1 | 3/2016 | King et al. | |
| 2016/0094398 A1 | 3/2016 | Choudhury et al. | |
| 2016/0094598 A1 | 3/2016 | Gedikian | |
| 2016/0094946 A1 | 3/2016 | Keithley | |
| 2016/0099758 A1 | 4/2016 | Bell et al. | |
| 2016/0105788 A1 | 4/2016 | Helms et al. | |
| 2016/0123745 A1* | 5/2016 | Cotier | G06F 16/9537 701/467 |
| 2016/0127875 A1 | 5/2016 | Zampini | |
| 2016/0182365 A1* | 6/2016 | Chang | H04L 45/02 370/352 |
| 2016/0188919 A1 | 6/2016 | Gao et al. | |
| 2016/0192407 A1 | 6/2016 | Fyfe et al. | |
| 2016/0277999 A1 | 9/2016 | Graves et al. | |
| 2016/0291127 A1 | 10/2016 | Huang et al. | |
| 2016/0345126 A1 | 11/2016 | Granbery | |
| 2017/0019765 A1 | 1/2017 | Hover et al. | |
| 2017/0031840 A1* | 2/2017 | Cawse | H04W 4/029 |
| 2017/0064667 A1 | 3/2017 | Mycek et al. | |
| 2017/0079001 A1 | 3/2017 | Lewis | |
| 2017/0099567 A1* | 4/2017 | Kwon | H04W 40/023 |

(56) References Cited

U.S. PATENT DOCUMENTS

2017/0171795 A1    6/2017  Wang et al.
2018/0288563 A1 * 10/2018  Krzych .................. H04W 4/02

FOREIGN PATENT DOCUMENTS

| | | | | | |
|---|---|---|---|---|---|
| EP | 2296407 | B1 | * | 9/2014 | ............. H04L 45/42 |
| EP | 3125579 | A2 | * | 2/2017 | ............ H04W 4/029 |
| KR | 20030084539 | A | * | 11/2003 | |
| KR | 20030084539 | A |  | 11/2003 | |
| KR | 20040050425 | A | * | 6/2004 | |
| KR | 101113052 | B1 |  | 2/2012 | |
| WO | 2008135432 | A1 |  | 11/2008 | |
| WO | 2015026862 | A1 |  | 2/2015 | |
| WO | 2016025175 | A1 |  | 2/2016 | |
| WO | 2016043388 | A1 |  | 3/2016 | |
| WO | 2017040690 | A1 |  | 3/2017 | |
| WO | WO-2017040690 | A1 | * | 3/2017 | ........... H04B 17/318 |

* cited by examiner

SYSTEM AND METHOD FOR LOW POWER DATA ROUTING

CROSS-REFERENCE TO RELATED APPLICATIONS

This application is a continuation of U.S. application Ser. No. 15/997,567, filed 4 Jun. 2018, which claims the benefit of U.S. Provisional Application No. 62/514,110, filed 2 Jun. 2017, both of which are incorporated in their entirety by this reference.

This application is a continuation of U.S. application Ser. No. 15/997,567, filed 4 Jun. 2018, which is a continuation in part of U.S. application Ser. No. 15/900,171, filed 20 Feb. 2018, which is a continuation of U.S. application Ser. No. 15/784,774, filed 16 Oct. 2017, which is a continuation of U.S. application Ser. No. 15/590,939, filed 9 May 2017, which claims the benefit of U.S. Provisional Application No. 62/416,395, filed 2 Nov. 2016, and U.S. Provisional Application No. 62/334,115, filed 10 May 2016, each of which is incorporated in its entirety by this reference.

This application is related to U.S. application Ser. No. 15/829,800, filed 1 Dec. 2017, which is a continuation of U.S. application Ser. No. 15/644,428, filed 7 Jul. 2017, which claims the benefit of U.S. Provisional Application No. 62/416,344, filed 2 Nov. 2016, and U.S. Provisional Application No. 62/359,543, filed 7 Jul. 2016, each of which is incorporated in its entirety by this reference.

This application is related to U.S. application Ser. No. 15/897,817, filed 15 Feb. 2018, which is a continuation of U.S. application Ser. No. 15/789,767, filed 20 Oct. 2017, which is a continuation of U.S. application Ser. No. 15/446,165, filed 1 Mar. 2017, which is a continuation of U.S. application Ser. No. 15/253,376, filed 31 Aug. 2016, which claims the benefit of U.S. Provisional Application No. 62/213,467, filed 2 Sep. 2015, each of which is incorporated in its entirety by this reference.

This application is related to U.S. application Ser. No. 15/921,844, filed 15 Mar. 2018, which is a continuation of U.S. patent application Ser. No. 15/620,014, filed 12 Jun. 2014, which is a continuation of U.S. patent application Ser. No. 15/288,302, filed 7 Oct. 2016, now issued as U.S. Pat. No. 9,712,967, which is a continuation of U.S. patent application Ser. No. 14/956,209, filed 1 Dec. 2015, now issued as U.S. Pat. No. 9,491,586, which is a continuation of U.S. patent application Ser. No. 14/463,582, filed on 19 Aug. 2014, now issued as U.S. Pat. No. 9,202,245, which claims the benefit of U.S. Provisional Application No. 61/867,493, filed on 19 Aug. 2013 and to U.S. Provisional Application No. 61/867,498, filed on 19 Aug. 2013, each of which is incorporated in its entirety by this reference.

TECHNICAL FIELD

This invention relates generally to the wireless communication field, and more specifically to a new and useful data routing method in the wireless communication field.

BACKGROUND

Beacon fleet management can be extremely resource consuming for large numbers of beacons, which conventionally require that each beacon be connected to a fixed power source in a physical location, such as a mains power source. This can limit the number of beacons able to be placed in a physical location as well as the arrangement of the beacons within the physical location.

On-going beacon control is also difficult because information, such as updated settings and firmware, needs to be individually loaded onto each beacon. Conventionally, beacon management has required the management entity to walk through the physical space, and individually connect to and program each beacon. This can be extremely resource consuming, particularly when the managing entity has multiple locations. Furthermore, there is a risk that the managing entity forgets to update hidden beacons (e.g., beacons that the managing entity forgets are there, beacons that are visually obscured from view, etc.), leading to end-user experience inconsistencies within the beacon population.

Thus, there is a need in the wireless beacon field to create a new and useful system and method for beacon fleet management. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
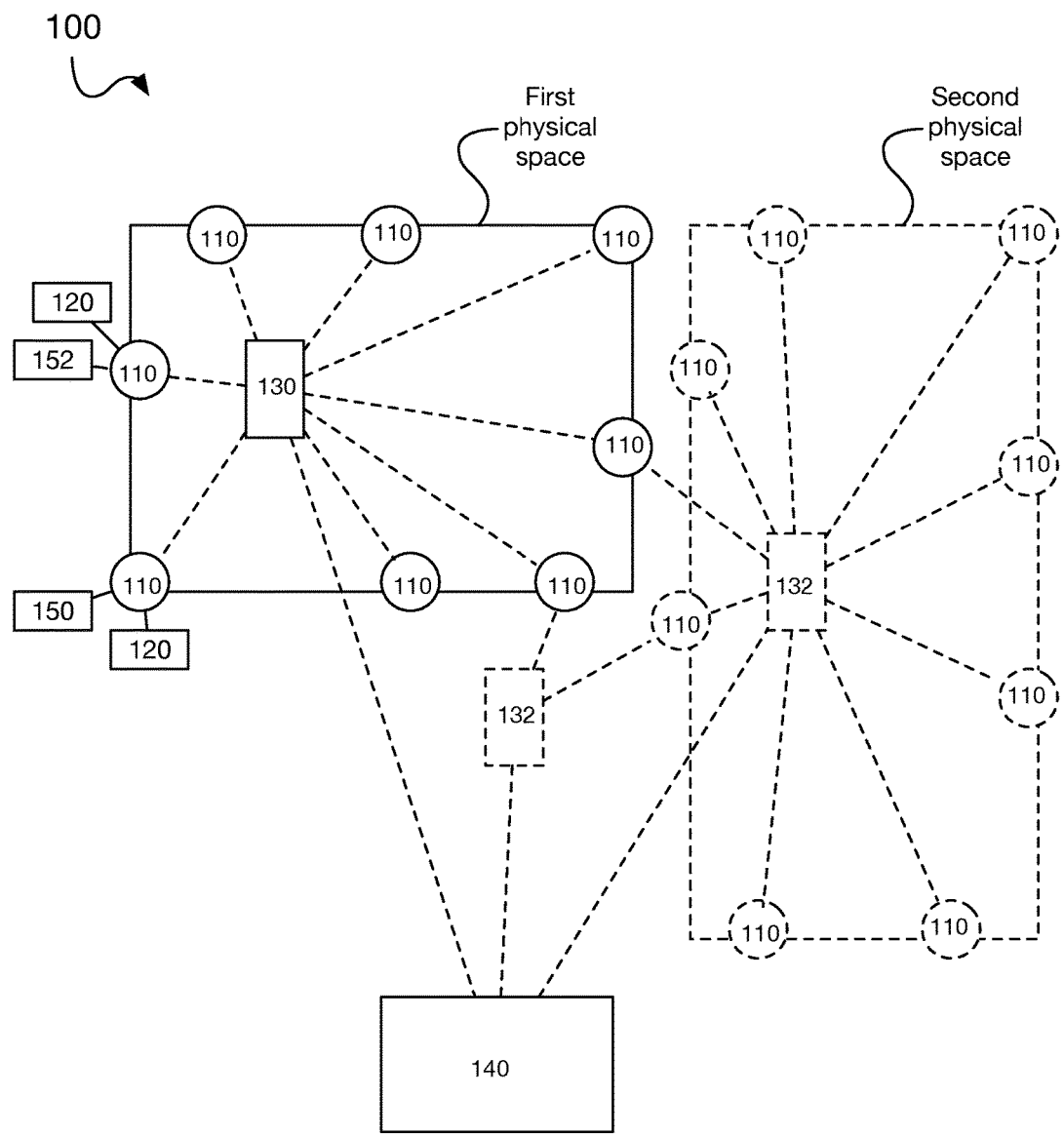
FIG. 2 is a schematic representation of the system for data routing.

As shown in FIG. 2, a system 100 for data routing includes a set of beacons (nodes) 110, an object 130, and a data routing system 140. Additionally or alternatively, the system 100 can include any number of objects 130 (e.g., intermediary devices 132), radios 120, power sources 150 (e.g., onboard battery 152), a second set of beacons 110, or any other suitable element.

Figure 1:
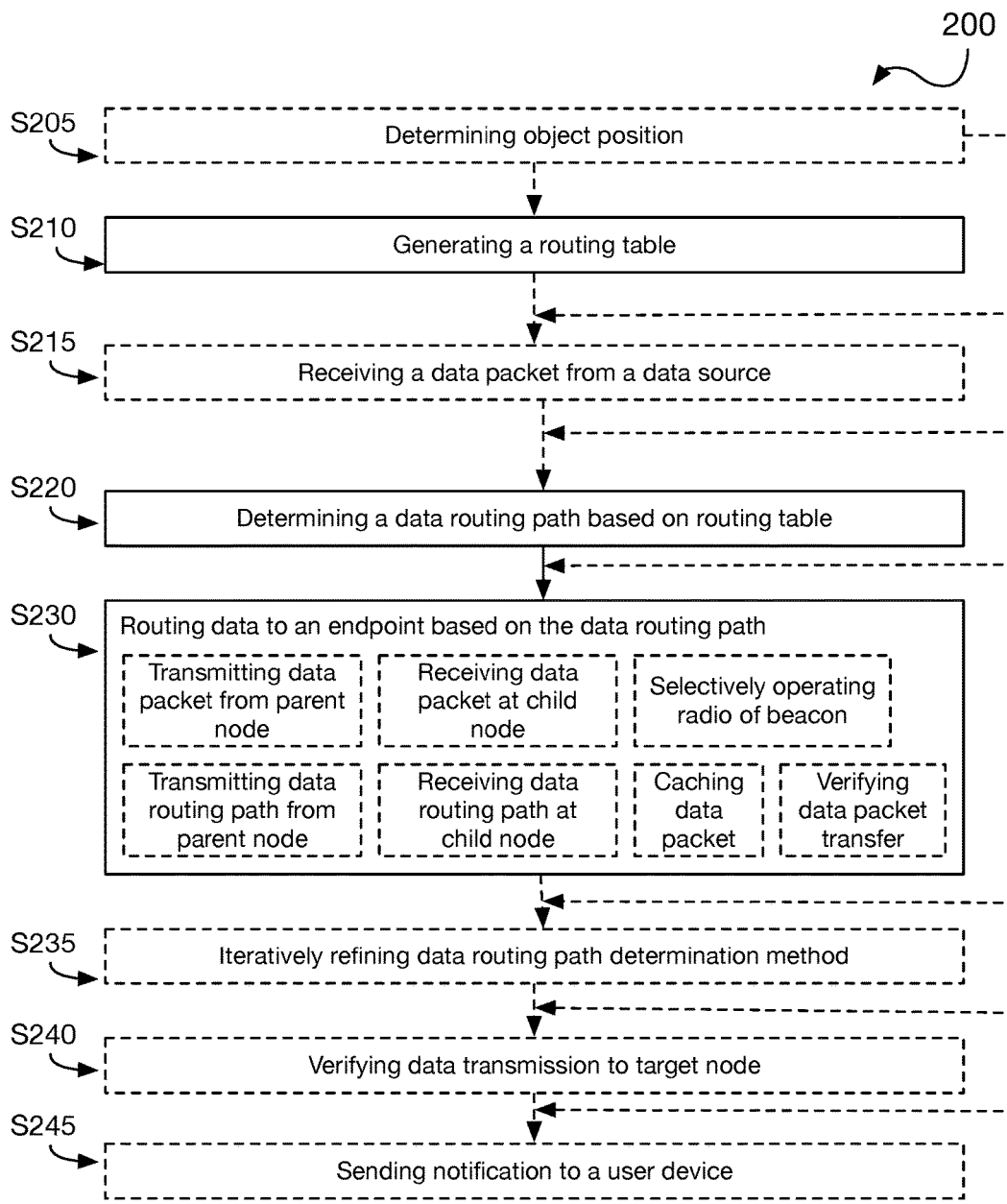
FIG. 1 is a schematic representation of the method for data routing.

As shown in FIG. 1, a method 200 for data routing can include: generating a routing table S210, determining a data routing path based on the routing table S220, and routing data to an endpoint S230. The method can additionally or alternatively include determining an object position S205, receiving a data packet from a data source S215, iteratively refining data routing path determination method S235, verifying data transmission to target node S240, sending a notification to a user device S245, or any other suitable process or set of processes, performed in any suitable order. The method preferably functions to route data from a data source to an endpoint (e.g., target beacon, an object, etc.) using a mesh collectively formed by a set of wireless beacons (e.g., without wired power and/or data connections), but can additionally or alternatively perform any other suitable function.

2. Benefits

The wireless system and method can confer several benefits over conventional data transfer solutions. First, the system can be easily installed in a physical space, due to the small form factor and simple mounting mechanisms (e.g., adhesive) of the mesh nodes. Furthermore, because the mesh nodes are wireless and/or battery powered, the resultant mesh topology is not dictated by the availability of wall plugs or access points.

Second, because the mesh nodes are statically mounted within the physical space, the resultant mesh will have less link breaks. This can result in a more stable, better-understood mesh (e.g., network topology), which can facilitate more efficient information transfer within the mesh. Some variants use low-power nodes with short-range radios and/or communication protocols. These variants can also result in a more stable, better-understood mesh, because the short-range inter-nodal connections can be less susceptible to signal interference (e.g., due to a lower probability of physical or EMI obstacle presence in the inter-nodal path; due to more stable connections, etc.).

Third, the system and method can reduce power to communicate information to a set of beacons. This can be particularly compelling in variations in which one or more nodes are battery powered and/or not constantly plugged into mains power during operation.

In some variations, thanks to addressing, a single message can contain a piece of data dedicated for a particular device—in this setup, only the minimum number of required devices will consume the message using just a portion of their power, which can optimize the time of propagation over, for instance, conventional flooding schemes.

In some variations, parameters such as physical distance, node type and/or endpoint type, node battery levels and/or other node parameters can be used to determine the routing (e.g., the routing table(s)) and/or balance the traffic within a mesh. This can further optimize for battery lifetime and/or reliable data routing through the mesh.

In some variations, the method entirely or partially offloads or splits the node routing process between the nodes of the local mesh and the cloud (e.g., remote computing system). This can minimize on-node/per-node route calculation and/or storage, which can in turn decrease node energy consumption. In one variation, network topology and routing paths (e.g., optimum relay path between a first and second node) are determined and maintained by the cloud and transmitted to nodes on a per-packet basis, wherein the nodes temporarily store the routing path for data packet transmission. Alternatively, a routing table can be determined at the cloud, wherein the routing table has static paths, and wherein the routing table is pushed to each node. Alternatively, the routing tables can be determined and stored on each node, wherein the routing tables can be different across the set of nodes. However, the processes can be otherwise divided. This offloading can be applicable in various short-range mesh network applications, particularly in applications that forward high latency packets (e.g., long transmission times are acceptable), that have low traffic (e.g., such that optimal network bandwidth utilization can be deprioritized), that can accept high loss rates (e.g., such that very precise control over data transfer is not needed), and/or in any other suitable application. This process offloading/splitting can additionally or alternatively decrease the amount of RAM needed and/or used on each node.

In variants, the method can automatically (remotely) update the network topology and/or routing tables. For example, network topology changes can be determined (e.g., calculated, modeled, detected, etc.) based on node telemetry (e.g., broadcast by the respective node and transmitted to the remote computing system via an intermediary device, such as a user device), node presence (e.g., determined based on whether a device that should be receiving the node packets is receiving the node packets), be manually reported, or be otherwise determined.

In some variations, the system and method confer a low-latency, high-bandwidth, energy efficient system because the respective radios of the mesh nodes can be selectively operated in the more-power-consuming transmission modes on-demand (e.g., when data needs to be passed), instead of constantly operating the radios in the transmission mode (e.g., scanning mode), or scheduling radio operation in the transmission mode. Furthermore, the system and method can be more energy efficient by leveraging low-power, short-range radios and/or protocols, such as BLE or UWB.

Figure 3:
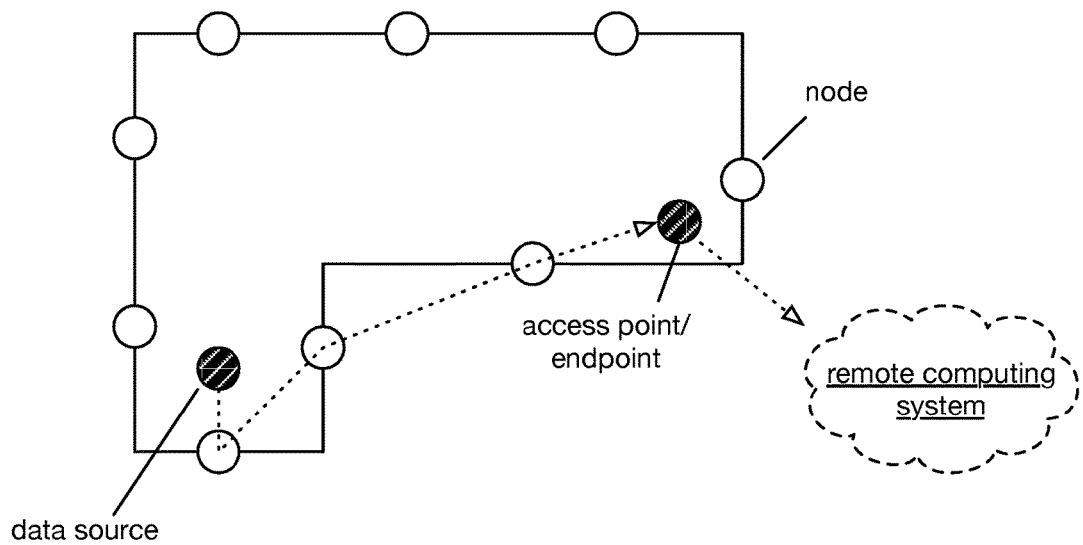
FIGS. 3 and 4 are a first and second example of low power data routing from a data source to an endpoint, respectfully.
Figure 4:
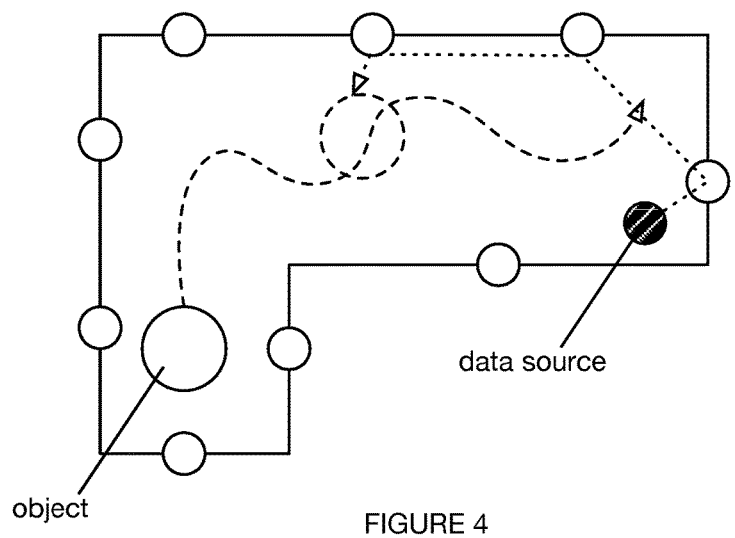

Fourth, the mesh nodes can connect to and transfer data to and/or from endpoints within the physical space encompassed by the resultant mesh. In one variation, the mesh nodes function as an intermediary between a remote data source (e.g., a remote server) and an endpoint within the physical space, wherein data is transmitted from the remote data source, through an access point with long-range connectivity (e.g., user device, router) within transmission range of a mesh node, from the mesh node to a subset of the mesh nodes of the mesh, and to the endpoint within transmission range of a final mesh node (or in reverse, example shown in FIG. 3). In a second variation, data from a local data source (e.g., user device) can be transmitted to the endpoint without leaving the physical space (example shown in FIG. 4). For example, data can be transmitted from the local data source, to an adjacent mesh node within transmission range of the local data source, through the mesh, to the endpoint within transmission range of a final mesh node. Because the data does not rely on access points to remote systems, this can reduce bottlenecking and/or latency. Furthermore, because the mesh can be formed from a large population of short-range nodes, this mesh can transmit data with low packet loss through physical spaces with complex EMI topography (e.g., to a WAP or other endpoint within the space). However, data can be otherwise transmitted through the mesh.

Fifth, some variants of the system and method can route the data through a predetermined series of nodes (e.g., data routing path). Because the data can be transmitted to different endpoints via different paths through the mesh (e.g., (pre-planned static paths, dynamic routing paths determined based on current or anticipated node operation parameters, etc.), the transmission load on each node can be optimized (e.g., reduced), which can reduce transmission latency and power consumption by the node and/or mesh overall.

Sixth, the mesh nodes can double as physical location identifiers (e.g., each be associated with a predetermined geographic location) or as content nodes (e.g., broadcast packets for content retrieval by recipient devices). In one example, user devices receiving advertisement packets broadcast by a node associated with a location (e.g., kitchen) can be determined to be proximal the location. In a related example, the signal quality indicator of the packet (e.g., RSSI) can be used to determine the user device distance from the node's known location. In a second example, the physical location of user devices receiving advertisement packets broadcast by multiple nodes, each with a known physical location, can be determined based on the respective known physical locations and/or signal quality indicators of the respective advertisement packets Seventh, the system and method can track how assets (e.g., devices, endpoints) move within the space, based on the known physical locations of each mesh node, which mesh node the asset is connected to, has received packets from, and/or is detected, and the parameters of packet receipt (e.g., RSSI, angle of receipt, receipt time, etc.).

Eighth, the communicated data can be endpoint-specific (e.g., endpoint control instructions, endpoint telemetry, etc.), mesh-node specific (e.g., updates for the mesh nodes themselves, node telemetry), or be any other suitable data.

Ninth, in some variations, the method includes one or more encryption processes, which function to enable secure data routing in the system (e.g., wherein data cannot be interpreted at an intermediary device). In some examples, for instance, node/beacon identifiers are initially encrypted and then decrypted at the cloud. Additionally or alternatively, any data or information can be un-encrypted, encrypted, or decrypted (e.g., by the target node) at any suitable location and point in the method. In one example, the remote computing system can encrypt the data with a key (e.g., symmetric key, public key of an asymmetric key pair), and the target node can decrypt the data with a complimentary key (e.g., the symmetric key, private key of the key pair). The complimentary key can be generated based on a seed (e.g., a shared seed, such as the manufacturer node ID, a timestamp, etc.), be manually stored (e.g., at manufacture), or otherwise determined.

Tenth, in some variations, the method reduces the time and/or effort to update settings (e.g., operational parameters) of a set of nodes. This can be accomplished through any or all of: individual addressing of nodes, optimized routing paths (e.g., optimized for physical distance, number of nodes along information path, etc.), or in any other suitable way.

3. System 100

The system 100 can be used with the method 200, or any other suitable method for routing data. The system 100 preferably includes a population of beacons 110, each beacon having one or more radios 120, and a data routing system 140, but can additionally or alternatively include any or all of: one or more objects 130, a set of power sources 150 (e.g., onboard batteries), or any other suitable element.

Each beacon 110 (node 110) of the population is preferably arranged within the broadcasting range of at least one adjacent beacon, but can be otherwise arranged. The beacons are preferably arranged between 4 and 5 meters apart, but can additionally or alternatively be arranged between 0 and 10 meters apart, less than 4 meters apart, greater than 10 meters apart, less than 100 meters apart, or at any suitable distance apart. The broadcasting range can be defined by the broadcasting power (e.g., vary as a function of the broadcasting power for the given beacon), by the radio type (e.g., of the broadcasting radio, of the data transmission radio, etc.), by the user (e.g., the distance from the beacon where the RSSI is above a predetermined value), be 5 m, 200 m, or otherwise defined. The population of beacons is preferably defined by a user (e.g., at a remote management system, by an application executing on the user device), but can include all beacons within broadcasting range of another beacon within the population, or be otherwise defined. The beacon population can be defined and/or configured before and/or after beacon deployment (e.g., physical attachment to the physical space). The beacons within a population are preferably the same type of beacon, but can optionally be different types of beacons (e.g., with different form factors, different radios, different protocols, etc.). The beacons of the population are preferably arranged within a common physical space, but can be otherwise distributed. Each physical space can include one or more beacon populations, wherein the beacon populations can share beacons or be formed from different beacons. However, the beacon population can be otherwise defined or configured.

The beacon population preferably includes multiple beacons (e.g., 2 beacons, 3 beacons, greater than 3 beacons, 20 beacons, 50 beacons, etc.) but can alternatively include a single beacon. The population (e.g., relative locations, composition, etc.) can remain static throughout the method; additionally or alternatively, beacons can be added to or removed from the population, intentionally or unintentionally (e.g., fall off the mounted surface) throughout the method. The beacon population is preferably all associated with a common user account (e.g., management entity) or security key (e.g., API key, which can be used to authenticate communications with and/or between beacons or nodes of the same population), but can alternatively be associated with different user accounts.

The beacon of the population can function as a mesh node (e.g., mesh router), an aggregation node, as a physical location identifier, an access point, as a sensor for the physical space, and/or to broadcast packets for content retrieval. The beacon can be operated as a mesh node: concurrently, asynchronously (e.g., interchangeably), periodically, or at any other suitable temporal relationship with beacon operation as a location and/or content beacon. Additionally or alternatively, the beacon can be operated as an aggregation node, or any other suitable type of node. The beacon can be mounted to surfaces (e.g., walls, ceiling, floor) of a physical space (e.g., physical venue). The beacon is preferably static (e.g., adhered to a wall, adhered to a stationary object in a room, placed on the floor, plugged into a power source, etc.) with respect to the physical space but can additionally or alternatively be at least partially mobile (e.g., mounted to a mobile object, carried by a user, attached to a moving object, attached to a vehicle, etc.), or attached to any other suitable mounting surface.

In some variations of a population of beacons, all the beacons are static. In other variations, a subset of the beacons can be static (e.g., forming a beacon mesh) and one or more beacons can be mobile (e.g., attached to or integrated with a mobile object). Additionally or alternatively, the system can have any combination of static and mobile beacons.

Each beacon (node) is preferably configured to be individually addressed (e.g., with a unicast address, virtual address, unassigned address, publish address, etc.). Additionally or alternatively, a set or subset of beacons can be addressed together (e.g., with a group address). The beacon address can be locally unique, globally unique, unique within a beacon population owned by a common entity (e.g., associated with a common user account, application client, or API key), or otherwise individually identifiable. The beacon address can be the same as, derived from (e.g., calculated from), or unrelated to the beacon identifier (e.g., manufacturer beacon identifier). The manufacturer beacon identifier can be globally unique, locally unique, or otherwise related to other beacon identifiers. The beacon can optionally broadcast: the manufacturer beacon identifier, a secure beacon identifier (e.g., automatically generated on-board the beacon using a rule shared between the beacon and the remote computing system), a UUID, major, and/or minor value, node telemetry (e.g., values encoding sensor measurements sampled by on-board sensors, such as state of charge, traffic, temperature, ambient light, noise, orientation, acceleration, etc.), link metrics, channel quality indicators, or any other suitable information in one or more advertisement packets.

The beacon is preferably a low-power device, but can alternatively be a continuously-powered device, a high-power device (e.g., uses a high-power consumption protocol or radio), or can be otherwise powered.

The beacon can include: one or more radios 120, processors (e.g., GPU, CPU, microprocessors, etc.), power sources 150 (e.g., batteries 152, primary batteries, secondary batteries, inductive charging systems, RF charging systems, etc.), sensors (e.g., orientation sensors, such as gyroscopes or IMUs, kinematic sensors, such as accelerometers, temperature sensors, ambient light sensors, acoustic sensors, pressure sensors, etc.), and mounting mechanisms (e.g., screws, adhesive, magnetic housings, etc.). The beacon can optionally include wired connectors (e.g., GPIO connectors), storage (e.g., RAM, Flash, etc.), or any other suitable component.

In one variation, all static beacons are battery-powered (e.g., CR2477 batteries, AAA alkaline batteries, etc.) with an onboard battery.

The radios can be short-range radios (e.g., UWB, BLE, Bluetooth, radios operating on IEEE 802.15 protocols, NFC, etc.), long-range radios (e.g., WiFi, Zigbee, etc.), radios configured to alternate between short-range and long-range communication, or be any other suitable radio. The radios can be high-bandwidth, low bandwidth, or support any other suitable communication. The radio system preferably forms a full-duplex system, but can alternatively form a half-duplex system or any other suitable system. The beacon can include one or more of each radio type.

Each beacon preferably has a radio operable in a set of operation modes but each beacon can additionally or alternatively have multiple radios (e.g., each configured to operate in a single operation mode, each configured to operate in multiple operation modes, etc.), or any number of radios in any arrangement.

The radio operation modes can include any or all of: an advertising mode (e.g., a slave mode, client mode, broadcast mode, etc.; wherein the beacon broadcasts/advertises packets but does not receive and/or process received packets); a scanning mode (e.g., a master mode, a server mode, transmission mode, listening mode, etc.; wherein the beacon listens for packets or can additionally both broadcasts and receives packets for processing); a default mode (e.g., off, standby, advertising, etc.), or any other suitable mode.

In some variations, the advertising mode includes conditional broadcasting, wherein the beacons do not broadcast if a set of one or more conditions are met, which can function to save energy. The conditional broadcasting can be based on (e.g., triggered by) any or all of: beacon orientation (e.g., does not broadcast when beacon is on back, motion (e.g., beacon does not broadcast while still, beacon does not broadcast while moving, etc.), environmental condition (e.g., light level, temperature, humidity, etc.), time (e.g., predetermined set period of time, predetermined time of day, in response to a scheduled event, etc.), beacon energy level (e.g., charge level, time of most recent charge, etc.), or any other suitable trigger.

The beacon preferably includes a low-bandwidth radio (e.g., operating in the client mode) and a high-bandwidth radio (e.g., selectively operated in the server mode, such as in response to receipt of a command by the low-bandwidth radio), but can additionally or alternatively include a second low-bandwidth radio (e.g., operating in a master mode, to monitor the number of devices passing by) or include any other suitable set of radios.

The system can optionally include one or more objects 130, which function as endpoints, intermediary devices, and/or data sources. The object can optionally function as a wireless access point (e.g., a mesh point), as the data routing system, or perform any other suitable functionality. The objects are preferably mobile (e.g., include translation mechanisms, such as wheels, treads, or rotors), but can alternatively be static.

Each object preferably defaults to operation in a scanning mode (e.g., listening mode, etc.), wherein the object is listening for signals broadcast by beacons. Additionally or alternatively, object can continuously or selectively operate in an advertising mode, serve as a beacon in the mesh, or be operating in any other operation mode. In one variation, the object is a user device (e.g., mobile phone).

Examples of objects that can be part of the system include: user devices (e.g., smartphones, tablets, etc.), robotic vacuums, drones, pets, connected devices (e.g., connected ovens, lightbulbs, desks, speakers, displays, etc.), or any other suitable object. The object can include one or more radios, processing systems (e.g., processors, on-board storage), sensors, or any other suitable component. The object and beacon preferably share one or more radio types (e.g., technologies, protocols, etc.), but can alternatively have different radio types, wherein an intermediary system (e.g., user device, secondary object) can function as a translation layer.

Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component The set of objects 130 preferably includes multiple intermediary devices 132, which function to connect one or more beacons 110 to a data routing system 140. Each intermediary device 132 is preferably a mobile device (e.g., wireless device), further preferably a user device (e.g., mobile phone with client application). Additionally or alternatively, the set of objection 130 can include a single intermediary device, no intermediary device, or any number of intermediary devices in any suitable form(s).

Figure 9:
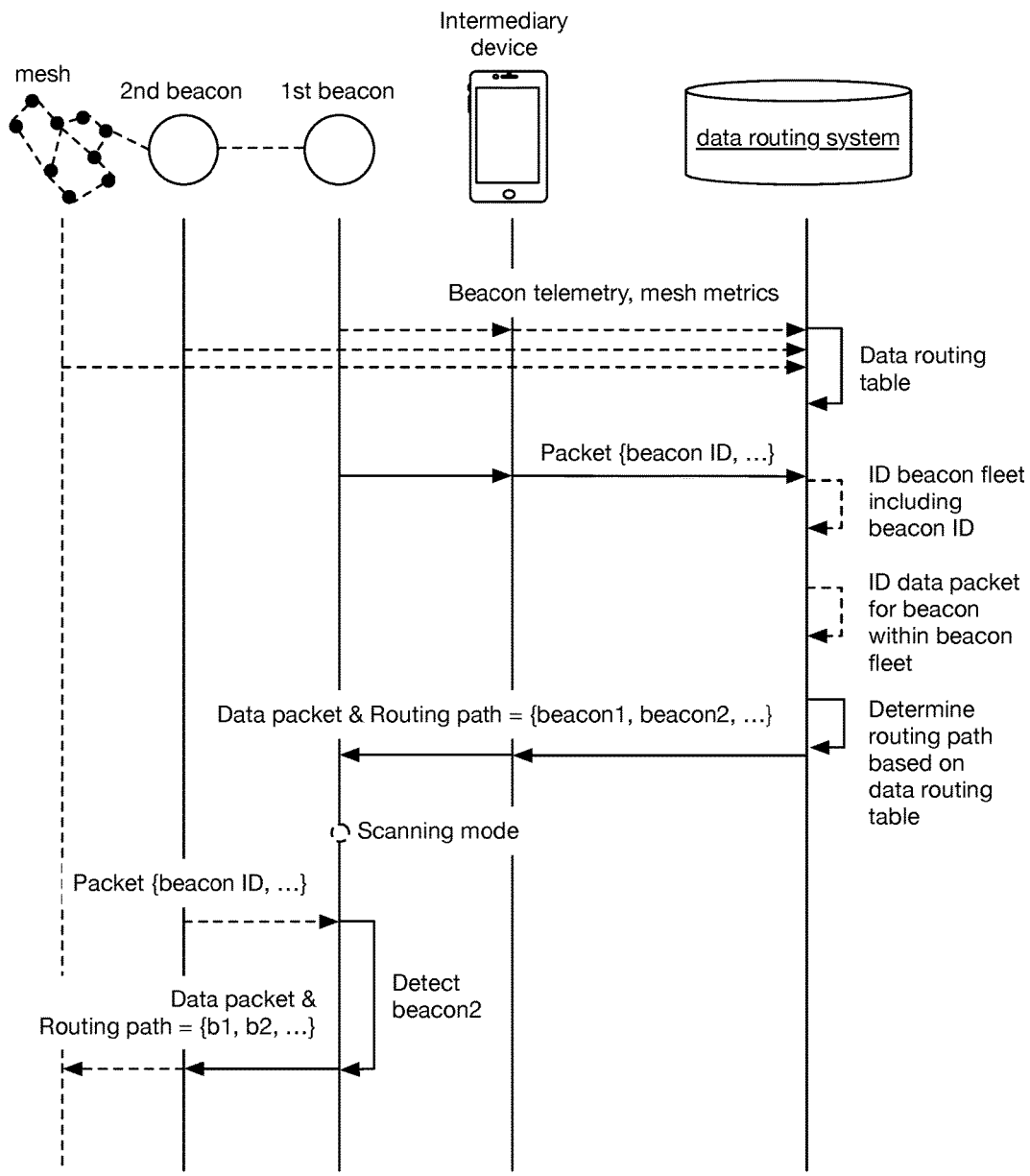
FIG. 9 is a schematic example of information flow within a system for data routing.

In one variation (e.g., as shown in FIG. 9), a set of one or more intermediary devices transmits data (e.g., node identifier, node telemetry) from a set of beacons to a remote data routing system (e.g., cloud-based computing system), and data (e.g., operational parameters, beacon settings, radio operation mode, routing path, routing table, etc.) from the remote data routing system to the beacon. In a specific example, all processing (e.g., determination of data routing path, updating of data routing table, etc.) is done at a remote data routing system, and data is transmitted to and from the mesh of beacons through the set of intermediary devices (e.g., set of multiple mobile phones, a personal computer, etc.). In another specific example, at least some data (e.g., beacon identifier) transmitted to the intermediary device are encrypted. This can function to protect information (e.g., beacon identifiers, routing paths, target beacon identifier, beacon location, data collected at a beacon, etc.) from being accessed and/or interpreted at an intermediary device (e.g., user device).

The system can optionally include a data routing system 140, which functions to determine the data transmission route through the mesh. The data routing system can optionally determine and/or store the mesh topology (e.g., node locations, EMI topology, etc.), mesh operation parameters (e.g., node operation parameters, data load, etc.), the routing table(s) (e.g., for one or more beacon populations or mesh networks), or any other suitable information. In one variation, the data routing system can: determine the endpoint location within the physical space; determine the location of a data source within the physical space; determine a mesh topology for the nodes; determine a routing path through the mesh network, based on the known mesh topology; and facilitate data transport through the mesh from the data source to the endpoint location according to the routing path. The data routing system can optionally track endpoint and/or data source movement within the space, and/or route the data through the mesh based on an anticipated endpoint and/or data source location (e.g., at the time of data packet arrival). The data routing system is preferably local (e.g., to the mesh network) but can alternatively be remote (e.g., from the mesh network; located in a physically separate and distinct location from the mesh network). The data routing system can be a remote computing system (e.g., cloud-based computing system), distributed storage system (e.g., cooperatively formed by the beacons), application (e.g., executing on a user device), web browser, object (e.g., IoT device, etc.), WAP, beacon, data source, endpoint, or be any other suitable computing system or set thereof.

The system 100 can include a routing table, which can be determined by the data routing system 140 and/or stored in storage associated with the data routing system 140 (e.g., cloud-based storage). The routing table can be used to determine routing paths, based on one or more parameters of the beacon mesh, such as, but not limited to: beacon (node) battery levels, physical distance (e.g., between nodes; as determined based on the respective RSSI for each node determined by a tertiary device, based on the RSSI for a node determined at a neighboring node, etc.), mesh topology, the type of node (and/or endpoint), node or cluster lifespan (actual, anticipated), node traffic (current, historic, or anticipated), node stability, node acceleration, and node operation environment (e.g., temperature, acoustic environment, ambient light, etc.). Additionally or alternatively, any other node parameters can be used to determine the routing table(s) and/or balance the traffic among the system 100. Alternatively, some or all of the node parameters can be ignored when determining the routing paths.

The system 100 can include one or more routing paths, which are preferably included in and/or determined by one or more routing tables. The routing paths are preferably optimal paths (e.g., optimized for time, optimized for distance, optimized for battery life, optimized for latency, etc.) among beacons in a mesh, but can alternatively be suboptimal paths (e.g., for one or more metrics or variables). The routing path can be static or dynamic, and can include: one or more endpoints (e.g., starting node, target node, etc.), all hops (e.g., intermediate nodes) in the path, a limited subset of hops in the path (e.g., next 3 hops), a transmission schedule, and/or any other information. Alternatively, the routing path can be dynamically determined on a hop-by-hop basis by the nodes in the path.

In one variation, the starting node can be the node that the intermediary device just received a packet from, and/or the node identified in a packet received by the data routing system.

In a second variation, the starting node can be another node within the local mesh, wherein the intermediary device does not transmit data received from the data routing system until the intermediary device receives an advertisement packet from (and/or connects to) the starting node.

4. Method

The method 200, which can be used with the system 100 or any other suitable system, can include: generating a routing table S210, determining a data routing path based on the routing table S220, and routing data to an endpoint based on the data routing path S230. The method 200 can additionally or alternatively include determining an object position S205, receiving a data packet from a data source S215, iteratively refining data routing path determination method S235, verifying data transmission to target node S240, sending a notification to a user device S245, or any other suitable step or set of steps, performed in any suitable order.

4.1 Determining an Object Position S205

The method can optionally include determining an object position S205, which functions to determine where an object (e.g., intermediary device) is in a predetermined volume (e.g., physical space, such as a room or building). The object 130 can receive the data packet from and/or transmit the data packet to the mesh network. The object can be a static device, mobile device, wireless access point, beacon, or be any other suitable object. The object preferably operates in a master or server mode (e.g., searches for slave or client devices to connect to), but can optionally operate in a slave or client mode or in any other suitable mode.

The object position can be determined by the object itself, by the mesh network, by a secondary system, or by any other suitable system. The determined object position is preferably stored by the data routing system but can optionally be stored by the object itself (e.g., retrieved upon system receipt of a data packet addressed to the object), or be otherwise stored. The object position can be the current, historical, and/or anticipated object position. The object position is preferably the physical location (e.g., coordinates, altitude) of the object within the space (e.g., such that the object can be mapped on a virtual map of the space), but can alternatively be a relative location (e.g., relative to the beacons cooperatively forming the mesh network), or be any other suitable location. The object position can be determined: periodically, upon receipt of data addressed to the object, once (e.g., for static objects), whenever the object is within a beacon's broadcasting range, or at any suitable time. The object position can be determined based on: the object kinematics (e.g., determined by object sensors; using dead reckoning, etc.), the known physical location(s) of the beacon(s) or secondary system(s) that connected to the object, the beacon packets received by the object, or based on any other suitable information.

In some variations, S205 includes broadcasting a set of node identifiers at a set of beacons, receiving the set of node identifiers at the remote computing system through the object (e.g., intermediary device, wherein the intermediary device acts as an intermediary and forwards all or portions of the received packet to the remote computing system), and determining a location of the object at the remote computing system based on the set of node identifiers.

S205 can be performed prior to or during the determination of the routing path (e.g., to determine access node), after the determination of the routing path (e.g., where the starting node is determined based on the data routing table, based on the data routing path, etc.), multiple times throughout the method (e.g., to locate multiple objects, to track the location of an object, etc.), or at any other time during the method.

In some variations, the locations of one or more intermediary devices 132 are determined based on the routing table.

Figure 6:
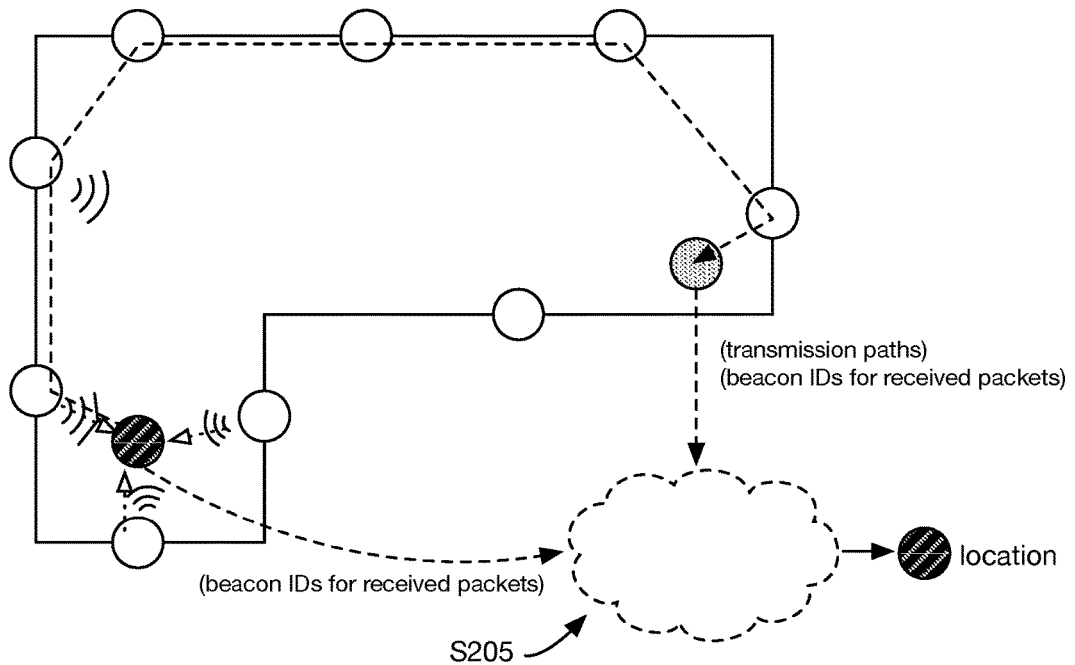

In a first variation, example shown in FIG. 6, determining the object location can include: broadcasting beacon packets (e.g., using a low-power radio) from beacons within the physical space; receiving the beacon packets at the object (e.g., beacons cooperatively forming the mesh network, beacons outside of the mesh network, etc.); and determining the object location based on the beacon packets (e.g., based on known physical locations associated with beacon identifiers extracted from the beacon packets, such as using trilateration, etc.) at the object or a remote system to which the object transmitted the received packet information. This variation can optionally include determining an anticipated object location based on the object's kinematic parameters (e.g., acceleration, velocity, rotary encoder measurements, etc.), operation instructions (e.g., received from beacon, user device, etc.), or other information. This variation can optionally include storing the object location (e.g., at the data routing system, wherein the object location can be transmitted to the data routing system through the mesh network through another communication channel; at the object; etc.), using the object location (e.g., for navigation, such as augmenting SLAM or another autonomous navigation method), or otherwise utilizing the object location.

Figure 5:
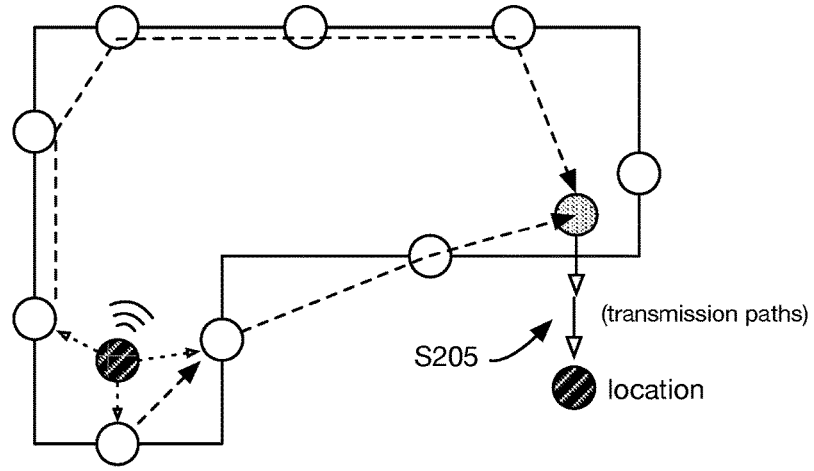
FIGS. 5 and 6 are a first and second example of determining the object location.

In a second variation, example shown in FIG. 5, determining the object location can include: detecting a signal broadcast by the object (e.g., object packets) at one or more beacons within the physical space (e.g., using a radio operating in a scanning or master mode), sending the signal information (e.g., signal characteristics, such as RSSI; signal information, such as object identifier) to the data routing system (e.g., using the mesh network; when the data routing system connects to the respective beacon; etc.); and determining the object location based on the locations of beacons detecting the object (e.g., for a given time period, over time, etc.).

However, the object location can be retrieved from a lookup table (e.g., based on the object address) or otherwise determined.

4.2 Generating a Routing Table S210

Generating a routing table S210 functions to determine one or more routing paths for a mesh network. Additionally or alternatively, S210 functions to store one or more mesh or node parameters, determine one or more mesh or node parameters (e.g., calculate a second set of parameters based on a first set of parameters), or perform any other suitable function.

S210 is preferably performed prior to receiving a data packet at the beacon mesh but can additionally or alternatively be performed after receiving a data packet at the beacon mesh, regularly (e.g., at a predetermined interval), after determining an object location S205, before determining an object location S205, in response to a trigger (e.g., updated operational parameters determined at data routing system), randomly, or at any other point.

S210 is preferably performed at the data routing system (e.g., remote computing system) but can additionally or alternatively be performed at a separate remote computing system, another processing system (e.g., at a client application of user device), a combination of systems, or at any other system.

S210 preferably includes: determining node telemetry and determining the routing table based on the node telemetry, but can additionally or alternatively include any number of steps and any other steps. The routing table can be determined in any or all of the following ways: manually (wherein an intermediary device with an application client is moved around the venue and receives packets broadcast by each node); using a flooding protocol (e.g., wherein each node or node cluster floods the network with node telemetry or other data); using a routing protocol (e.g., wherein each node forwards the respective node telemetry to a designated access point); or in any other suitable way.

In one variation, the routing table is determined initially through flooding, wherein the proximity and/or relative pose of adjacent nodes relative to each node can be determined through the flooded information and/or parameters thereof (e.g., transmission paths). Node telemetry (e.g., state of charge) for each node can optionally be determined from flooding (e.g., wherein the flooded information can include the respective node's telemetry). S210 can be static or repeated (e.g., upon change in the beacon mesh such as an added beacon, removed beacon, change in location of one or more beacons, etc.).

In a second variation, the routing table (and/or mesh topology) is determined from node telemetry, broadcast by the nodes of the mesh network. The node telemetry is preferably broadcast by each node and forwarded to the data routing system through one or more intermediate devices. In this variation, the intermediate device(s) can optionally be used to determine the relative proximity and/or poses of the nodes in the mesh (e.g., based on which nodes the advertisement packets are received from within a predetermined time window at the intermediary device, based on the intermediary device location or kinematic information, etc.). However, the mesh topology and/or routing table can be otherwise determined.

S210 can further include receiving and/or determining one or more parameters of the set of beacons, wherein the routing table is determined based on the parameters. Each of the parameters is preferably tagged with a corresponding beacon identifier (e.g., encrypted beacon identifier) but can additionally or alternatively be tagged with a group (e.g., beacon mesh) identifier, a set of coordinates (e.g., positional coordinates), any other suitable tag, or can be untagged.

The parameters can be determined from node telemetry, a user input, a set of predetermined settings, an algorithm (e.g., predictive algorithm, deep learning algorithm, etc.), or any other suitable source. Parameters preferably include a power level (e.g., charge level battery) of each beacon but can additionally or alternatively include a beacon location (e.g., relative to another beacon, within a physical space, height, etc.), temporal parameter (e.g., time since beacon last broadcast a signal), data from a sensor associated with one or more beacons (e.g., motion sensor, temperature sensor, optical sensor, etc.), strength of a signal broadcast by a beacon (e.g., RSSI), type of signal broadcast by a beacon (e.g., default signal, emergency signal, etc.), message cache parameters (e.g., message identifiers, message numbers in the cache, etc.), or any other suitable parameter.

The parameters (e.g., node telemetry) are preferably received at the data routing system (e.g., remote computing system) via one or more intermediary devices (e.g., user devices) but can additionally or alternatively be received directly at the data routing system (e.g., from user input, from the beacon mesh, etc.), predetermined (e.g., static) and stored at the data routing system, or received at the data routing system in any suitable way.

S210 can optionally include determining mesh topology, wherein the routing table is determined at least in part from mesh topology. The mesh topology can be automatically determined by the mesh nodes, determined by an application executing on a user device, or otherwise determined. In a first variation, the mesh nodes operate the respective radios in the transmission mode upon satisfaction of a setup condition (e.g., mesh node attachment to a surface, mesh node orientation in a predetermined orientation, etc.), wherein the identities and relative positions of neighboring nodes can be automatically determined based on the signal parameters (e.g., RSSI, time of flight, angle of arrival, etc.), the node telemetry (e.g., orientation relative to gravity, etc.), and/or any other suitable information. In this variation, the identifiers for the neighboring beacons can be stored on-board the beacon (e.g., in on-board memory), transmitted through the mesh to the data routing system for indexing and/or storage, or otherwise managed. In a second variation, the application on the user device automatically logs user device parameters, such as location and time, along with the beacon packet parameters (e.g., beacon identifiers, RSSI, angle of arrival, etc.) that are received as a user walks within the space. In this variation, the application can optionally determine whether a beacon is located within the broadcasting range (e.g., of the broadcasting radio, communication radio) of an adjacent beacon (e.g., the RSSI for a first beacon's signal is above a first RSSI threshold, and the RSSI for a second beacon's signal is above a second RSSI threshold, the second RSSI threshold lower than the first and associated with an outer limit of a broadcasting range).

In one variation, the data routing table is eventually used to determine a routing path S220 (e.g., routing path determined to minimize distance between beacons through which data packet travels). Alternatively, the data routing table can be composed of routing paths (e.g., determined simultaneously). Each routing path preferably optimized for one or more network parameters (e.g., overall battery life, overall bandwidth, overall latency, etc.), or optimized based on the parameters (e.g., battery life, bandwidth, latency, etc.) for each node or cluster, but can be otherwise determined.

The data routing system can generate and store a different routing path for each endpoint pair permutation. Alternatively, the data routing system can dynamically determine a routing path in response to occurrence of a trigger event (e.g., receiving an identifier for a node within the local mesh, determining that data needs to be pushed to a node within the local mesh, etc.). The data routing system can dynamically update the routing paths within the routing table in response to receiving updated beacon telemetry, at a predetermined frequency, or at any suitable time.

In one variation, node telemetry is received at the data routing system (e.g., remote computing system), wherein the node telemetry includes a battery level for each node and wherein the routing table is determined at least in part from the set of battery levels. In a specific example, the node telemetry is received at the remote computing system through a user device.

In a second variation, node telemetry is received at the data routing system (e.g., remote computing system), wherein the node telemetry includes a signal strength of a data packet received at a first beacon from an adjacent beacon, wherein the routing table is determined at least in part based on the signal strength. In a specific example, signal strength is used at the data routing system to determine (e.g., calculate) a physical distance between the beacons.

4.3 Receiving a Data Packet from a Data Source S215

The method 200 can optionally include receiving a data packet from a data source 215. The data source can be a static device (e.g., beacon, connected fixture, wireless access point), a mobile device (e.g., user device), or any other suitable object. The data packet is preferably received at a mesh node, but can alternatively or additionally be received at the data routing system or be received at any other suitable system. The data can be: beacon data (e.g., addressed to one or more beacons or beacon populations), object data, or be any other suitable data. The data packet preferably includes data associated with the mesh network (e.g., addressed to a node within the mesh network), but can alternatively or additionally include data associated with a client executing on a mobile device that receives packets from the mesh network, or any other suitable data associated with the local mesh in any suitable manner.

The data packet is preferably received (and/or transmitted) to the mesh network (e.g., via an intermediary device within communication distance of the mesh network) when an intermediary device receives a packet from a node in the mesh. In one variation, the data packet is transmitted (e.g., from the remote computing system, data routing system) when the first node is part of a mesh network that is associated with a data packet (e.g., unsent data packet) that, in turn, is associated with a target node within the mesh network (e.g., wherein a data packet is transmitted in response to determination that the data packet, addressed to a target node within a mesh shared with the first node: exists, is unsent, or has not been received by the target node). However, the data packet can be received and/or transmitted at any suitable time.

In some variations, the beacon data includes beacon settings (e.g., broadcasting scheme) and/or operational parameters. These can include any or all of: location settings (e.g., advertising interval, broadcasting power, etc.), telemetry (e.g., connection parameters), conditional broadcasting parameters, conditional receipt parameters, and/or any other suitable parameters. These settings and/or parameters can be updated (e.g., routinely updated, updated in response to an update received at a remote server, updated in response to a change in the beacon mesh, etc.) or static. The settings and/or parameters can be automatically updated, updated once one or more communication radios are in a predetermined operation mode (e.g., listening mode, master mode, etc.), updated in response to a user input (e.g., user input at a client application executing on a user device, user input at a remote server, etc.). The beacon data can include one or more beacon identifiers (BID), which function to associate a data packet with a specific (e.g., individually-addressed) beacon.

The data is preferably encrypted (e.g., wherein the endpoint has the corresponding cryptographic key), but can alternatively be unencrypted. The data can include: beacon updates (e.g., setting changes, etc.), beacon outputs (e.g., beacon telemetry, beacon operation parameters), object outputs generated by the in-situ object (e.g., telemetry data, operation parameters or operation notifications, sampled data, etc.), device control instructions (e.g., remote control instructions), or be any other suitable information.

Each of the BIDs are preferably encrypted, but can additionally or alternatively be unencrypted, decrypted, or have a subset that are encrypted. In one variation, encrypted BIDs are decrypted at the data routing system (e.g., remote computing system, cloud-based server, etc.). In a specific example, the method involves data transfer between a beacon mesh, intermediary device (e.g., mobile phone), and remote computing system (e.g., cloud-based server), where the BID is encrypted at the beacon, decrypted at the remote server, and used to determine a data packet transmitted from the remote server to a user device (e.g., intermediary device).

Receiving the data packet from the data source preferably includes: operating the data source in a scanning or master mode, detecting a mesh node within range (e.g., within broadcasting range), connecting to the mesh node, and transmitting data to the mesh node over the established connection. However, the data can be otherwise received. The mesh node (e.g., beacon) receiving the data packet is preferably the beacon most proximal the data source (e.g., the beacon with the highest RSSI), but can alternatively be all beacons within range (e.g., wherein the beacons can bid for control or otherwise determine which of the received beacon packets control) or be received by any other suitable system. The mesh node can be determined based on the location of an intermediary device (e.g., beacon closes to intermediary device), can be a node within broadcasting range of a previous node or device, can be the first node in a data routing path, can be the node with a high (e.g., highest) charge, or can be determined in any other way.

The data can include: the data packet, routing instructions (e.g., routing path; wherein the data source functions as the data routing system and retrieves the mesh topography from a local or remote repository), and/or any other suitable information. When the data lacks routing instructions, receiving the data packet can optionally include: routing the data packet to the data routing system (e.g., through the mesh, using a flooded technique or a predetermined transmission route for each node), wherein the data routing system subsequently determines the data routing path. Additionally or alternatively, receiving the data packet can optionally include: determining data packet parameters from the data packet (e.g., packet size, information type, header information, which node the data packet is stored at, etc.), routing data packet parameters to the data routing system, and subsequently routing the data packet from the recipient mesh node to the endpoint based on the routing path determined by the data routing system. However, the data packet can be otherwise received.

S215 can further include determining the data packet, which can include operation parameter settings (e.g., conditional broadcasting settings, frequency of broadcasting, frequency of switching radio operation mode, etc.) for one or more beacons, a message (e.g., to be sent to a user through a user device), command, or any other suitable data type, wherein the endpoint can operate according to the operation parameter settings upon packet receipt. The data packet can be determined based on input from an intermediary device, predetermined, include data uploaded to the data routing system, or include any data determined in any suitable way.

4.4 Determining a Data Routing Path Based on the Data Routing Table S220

Determining a data routing path through the wireless system mesh S220 functions to identify a series of mesh nodes to be used to transmit data to the endpoint. Alternatively, the mesh network can relay messages using a flooding technique, or any other suitable technique. Additionally or alternatively, S220 can function to minimize a routing parameter (e.g., energy consumption, time, etc.) for data transfer, minimize the number of beacons involved in the transfer of data, preserve energy within one or more beacons in a mesh (e.g., transfer data between beacons having the highest power), determine the locations and/or layout of one or more beacons (e.g., relative to each other, absolute, within a physical space, etc.), or perform any other suitable function.

The data routing path is preferably determined by the data routing system, but can additionally or alternatively be determined by any other suitable system. The data routing path is preferably transmitted with the data packet, but can alternatively be transmitted separate from the data packet (e.g., over a different channel, before data packet transmission, etc.).

S220 is preferably performed after a data routing table has been generated but can additionally or alternatively be performed simultaneously (e.g., with partial overlap) with the determination of the routing table, without the use of a routing table (e.g., dynamically determined at beacon(s)), multiple times throughout the method, during transfer of data (e.g., after receipt at multiple beacons in the routing path, after transmission to multiple beacons in the routing path, in response to a change in mesh, in response to a change in a beacon parameter, etc.), or at any other suitable time. Additionally or alternatively, S220 can be performed after a data packet has been received at a first node, before a data packet has been received at the first node, or at any other suitable time or set of times. In some variations, S210 and S220 can be combined into a single step (e.g., when data routing table includes only one or more multiple data routing paths). Alternatively, the method can be performed without one of S210 or S220.

In one example, the data routing path can be predetermined and distributed to the mesh (e.g., using the flooded technique, using the data routing table), wherein each node in the path stores the address of the respective child node (e.g., for a given packet identifier, packet type, etc.). However, the data routing path can be otherwise passed or stored. The data routing scheme preferably enables a unicast addressing method, but can additionally or alternatively enable an anycast scheme, a multicast scheme, a geocast scheme, a broadcast scheme, or any other suitable scheme. The data routing path preferably identifies the beacons the data packet should be transmitted through, when the data packet should be transmitted to the next beacon in the path (e.g., timestamp for scheduled transmission), and/or the order of beacons within the transmission path). However, the data routing path can include which radio (communication radio) to use for packet communication (e.g., for each node, for the path, etc.), the transmission duration, the transmission power, or include any other suitable information. For example, the communication radio can be: a predetermined radio, a radio selected based on the data packet parameters (e.g., based on the required latency, determined based on the packet header, packet analysis etc.; packet priority; packet size, etc.), a radio or channel selected based on the parent node's communication radio or channel (e.g., be the same or different radio or channel), or be otherwise determined. Alternatively, the node can determine all or part of the transmission parameters discussed above.

Figure 7:
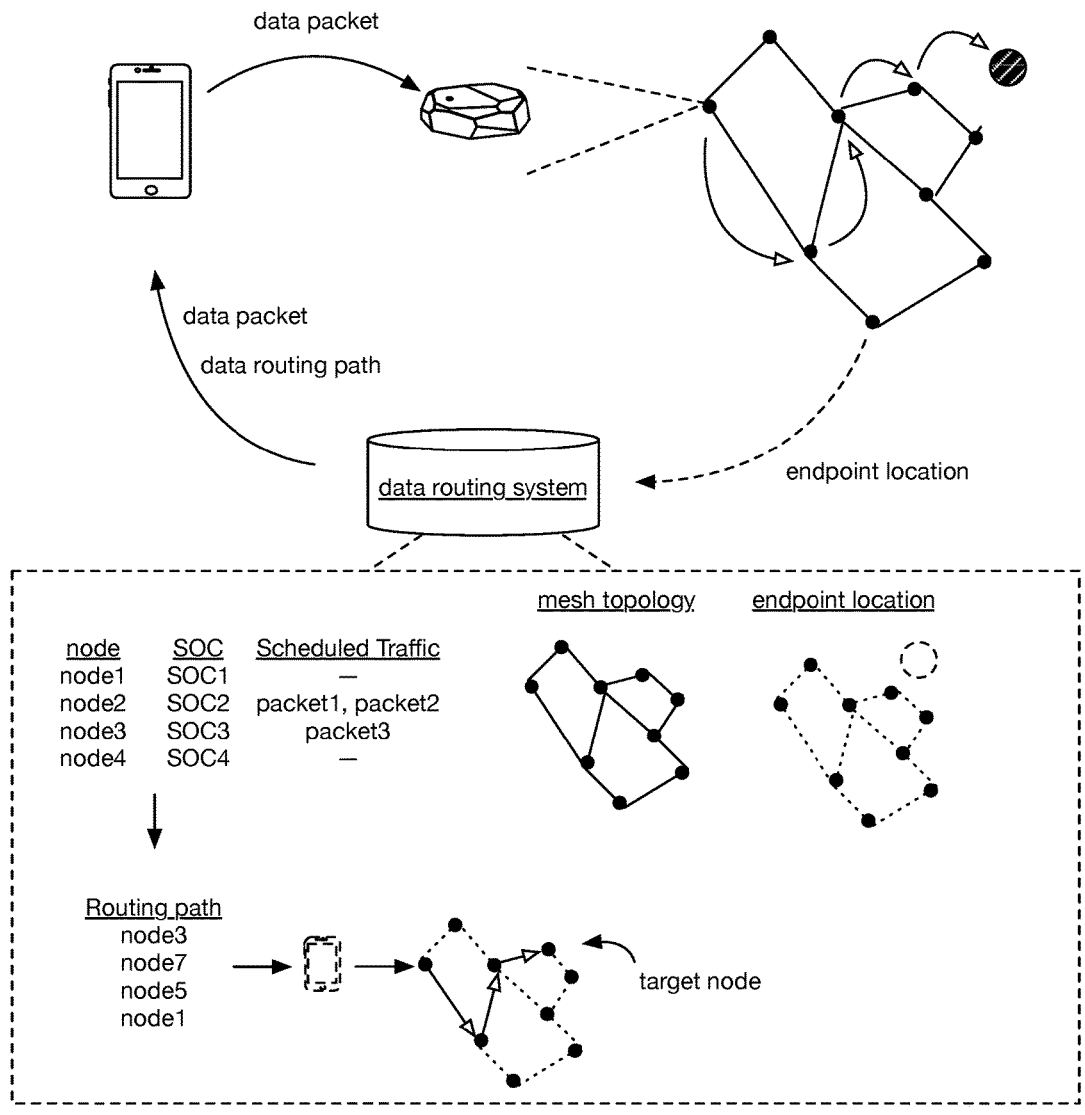
FIG. 7 is a schematic example of determining a data routing path and routing the data through the data routing path.

The data routing path can be static (e.g., predefined for a specific endpoint, such as a static object), dynamic (e.g., change based on mesh operation parameters, endpoint location, etc.), updated at predetermined intervals of time, updated at random intervals of time, or otherwise variable. The data routing path is preferably determined before routing the data through the mesh (e.g., once, in response to receipt of data addressed to the endpoint, upon determination that the endpoint has moved, etc.), but can alternatively be determined while the data is being routed through the mesh, or at any other suitable time. The data routing path is preferably determined based on the known mesh topology (e.g., physical beacon locations, EMI regions, etc.) and the endpoint's position within the physical space (e.g., current, historical, or anticipated), but can additionally or alternatively be determined based on data packet parameters (e.g., size, latency requirement, data source priorities), each node's operating parameters (e.g., current or anticipated; such as battery level or state of charge, device connection frequency, which radios will be available, etc.), each node's communication load (e.g., current and/or anticipated data traffic for each node), or any other suitable parameter (example shown in FIG. 7). The node parameters (e.g., node operating parameters, communication load, etc.) can be determined by: the node, wherein the node can broadcast the determined node telemetry (e.g., node operating parameters) in the advertisement packets (e.g., wherein the node telemetry and node identifier can be received and stored by the remote computing system); the remote computing system, wherein the remote computing system can estimate the node parameter values based on the frequency and/or volume of intermediate device queries identifying the node; or otherwise determined. One or more data routing paths can be determined for a given data packet. When multiple data routing paths are determined, each data routing path can be scored (e.g., based on latency, path length, probability of packet receipt, etc.) and the final data routing path can be selected based on the score.

The data routing path can be: estimated based on the parameters above, iteratively refined, randomly determined, calculated (e.g., optimized), predetermined, determined based on an algorithm, partially or fully determined through deep learning (e.g., machine learning), or otherwise determined. Examples of methodologies that can be used to determine the data routing path include: position-based routing, proactive routing (e.g., OLSR, Babel FRC, DSDV, DREAM), reactive routing (e.g., ABR, AODV, FRC, flow state in RFC, power-aware DSR-based routing), hybrid routing (e.g., ZRP, ZHLS), hierarchical routing protocols (e.g., CBRP, FSR, Order one network protocol, ZHLS), distance vector algorithm (e.g., Bellman-Ford algorithm, RIP, OSPF, IS-IS, EIGRP), link-state routing protocol (e.g., Dijkstra), optimized link state routing protocol, path vector routing, heuristic routing, fuzzy routing, policy-based routing, wormhole routing, small world routing, turn restriction routing, edge disjoint shortest pair algorithms, or any other suitable protocol or combination thereof. Determining the data routing path can employ self-healing algorithms (e.g., shortest path bridging), and/or use any other suitable method.

The data routing path is preferably determined at the data routing system (e.g., remote computing system where routing table is generated). Additionally or alternatively, the data routing path can be determined at a local computing system, a user device (e.g., client application executing on user device), at multiple computing systems (e.g., at two remote computing systems, at a remote computing system and at a client application executing on a user device, etc.), or any other suitable location. In some variations, the routing path is at least partially determined and/or stored at a beacon or group of beacons. Additionally or alternatively, the routing path can be predetermined.

The data routing path preferably includes all beacons at which a data packet will be received (e.g., child node; successive node) and optionally transmitted from (e.g., parent node; preceding node). This can include just a first beacon (e.g., endpoint, starting beacon, etc.); a first beacon and a target beacon (e.g., endpoint); a first beacon, a target beacon, and all beacons in between (e.g., all hops in between first and target beacons); or any other suitable set of beacons. The beacons are preferably individually addressed in the routing path through a beacon identifier (e.g., unencrypted beacon identifier, encrypted beacon identifier, decrypted beacon identifier, etc.), but can additionally or alternatively be individually addressed with any suitable tag (e.g., physical location tag, battery level tag, etc.), addressed as a group, or identified in any other suitable way.

In some variations, the routing path includes one or more mobile objects (e.g., intermediary device, user device, mobile beacon, etc.), wherein a data packet is transferred to and/or received from the mobile object. In these variations, the routing path can include an access node proximal to (e.g., adjacent to, in closest proximity to out of the set of beacons, within range, in the same physical venue, etc.) the mobile object. The access node can be predetermined, dynamically determined (e.g., based on location of mobile object), or otherwise determined.

In a specific example, for instance, the target node includes a mobile object (e.g., intermediary device), wherein the routing path includes an access node, the access node immediately preceding the target node in the routing path.

In some variations, the data routing path can be determined to maximize the overall mesh lifespan, each node's lifespan, the overall power consumption, probability of packet receipt, or any other suitable parameter. Alternatively or additionally, the data routing path can be determined to minimize the number of node hops, the latency, network path length, physical path length, or any other suitable parameter. In a specific example, the data routing path can route around high-traffic beacons (e.g., beacons detecting devices passing by at a rate higher than a threshold rate), which can minimize energy consumption and/or maximize beacon broadcasting time.

4.5 Routing Data to an Endpoint Through the Mesh S230

Routing the data to the endpoint through the mesh S230 functions to communicate data from the source object (data source) to the endpoint object. The data is preferably routed to the endpoint through the determined data routing path, but the data can alternatively be flooded into the mesh or otherwise transmitted through the mesh to the endpoint.

Routing the data through the determined path preferably includes selectively operating the radio(s) of each successive node (beacon) within the determined path to send and/or receive the data packet(s), then switching the radio(s) into a default operation mode (e.g., standby, client mode) after the data has been transmitted. This selective radio operation can function to minimize beacon power consumption while enabling data transmission functionality. Alternatively or additionally, S230 can include selectively operating the nodes (e.g., all nodes in the mesh, a subset of the nodes, etc.) in a scanning mode for a predetermined duration (e.g., 1 minute) at a predetermined frequency (e.g., according to a schedule, every 3 minutes, etc.), wherein the data can be routed through as many nodes (hops) in the routing table while the mesh operates in the scanning mode. The data can be temporarily cached in the intermediary node (e.g., along the routing path) when the mesh collectively switches back to operation in the advertising mode, and forwarded along the remainder of the routing path the mesh next operates in the scanning mode. However, the nodes of the mesh can otherwise implement S230.

The radio used to communicate the data (communication radio) is preferably the beacon's high bandwidth radio (e.g., UWB, WiFi), but can alternatively be the beacon's low bandwidth radio (e.g., BLE 5.0), or be any other suitable radio. The communication radio can be the radio used to broadcast beacon packets (e.g., location packets, content packets) or be a different radio. For example, different radios can be selected for streaming video, versus transmitting control instructions or device updates. However, the data can be otherwise routed through the data routing path.

Figure 8:
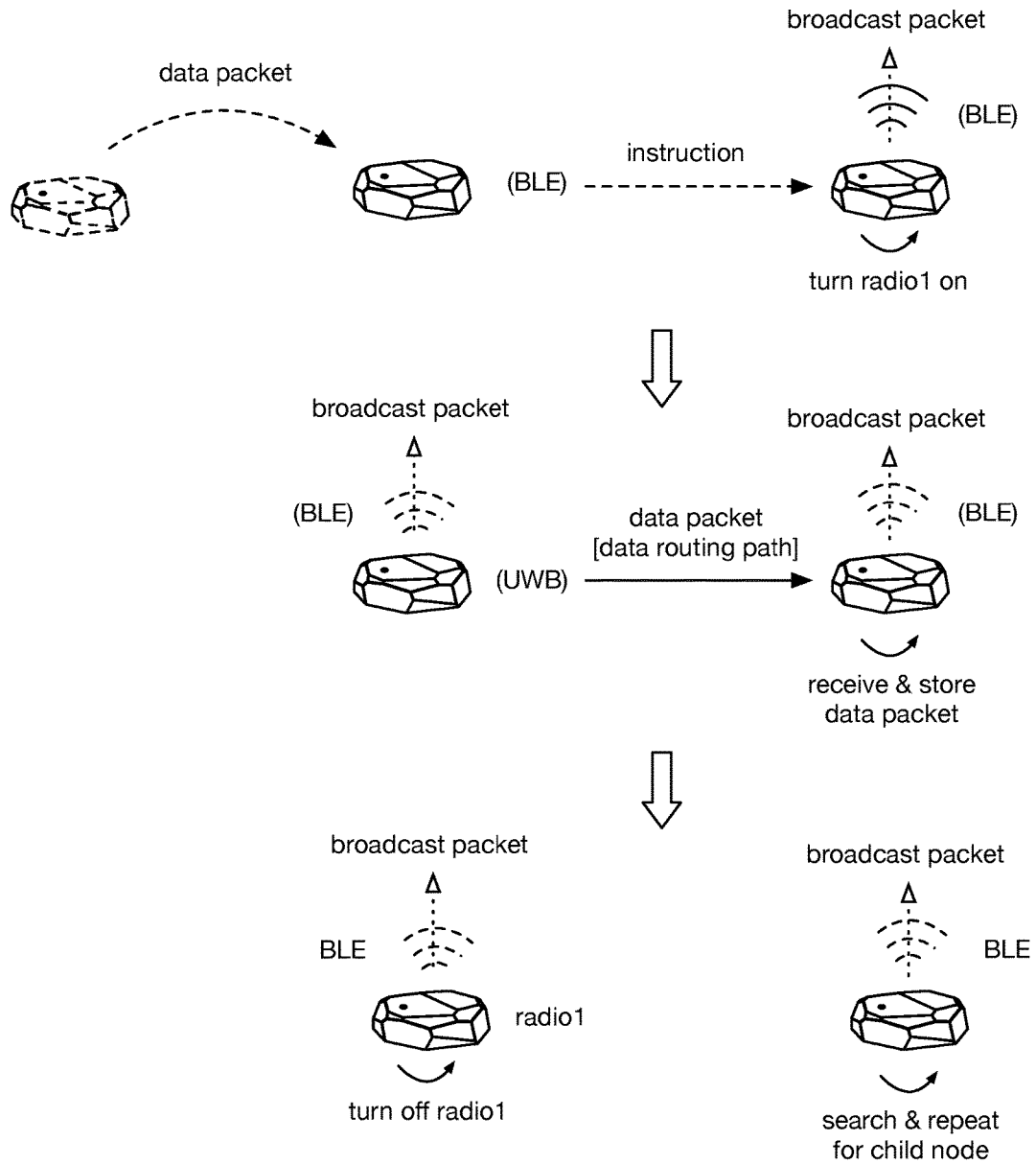
FIG. 8 is a schematic example of selectively controlling beacon operation to route data along the data routing path.

Routing data preferably includes, for each node: determining transmission condition satisfaction, selectively operating the communication radio in the transmission mode in response to transmission condition satisfaction, receiving the data packet from a parent node in the data routing path, transmitting the data packet to a child node in the data routing path, and selectively operating the radio in a default mode after data packet transmission, example shown in FIG. 8. However, data can be otherwise routed through the mesh.

The transmission condition can be predetermined, determined by the data routing system, or otherwise determined. The transmission condition can be: timer expiration, the current time matching a scheduled time, receipt of instructions to operate the communication radio, receipt of a data packet at the node, or any other suitable transmission condition. The instructions can be determined by and/or received from the data source, a parent node (e.g., in the data path, in a flooded system), a secondary object (e.g., wherein the parent node transmits the instruction to the secondary object, which relays the instruction to the node), or from any other suitable source. The instructions can include: the radio selection, the broadcasting parameters, the data routing path, an identifier for the child node (e.g., next node in the path), or any other suitable information. The instruction can be received by the broadcast radio, the communication radio, or by any other suitable radio. In a first variation, determining transmission condition satisfaction includes: scanning for beacon packets broadcast by the node with a broadcast radio of the parent node operating in a transmission mode; establishing a connection between the node and a parent node over a broadcast radio (e.g., broadcasting a low-bandwidth beacon packet), and receiving an instruction to operate the communication radio (e.g., of the child node) over the broadcast radio. In a second variation, determining transmission condition satisfaction includes: broadcasting an instruction packet addressed to the node from the parent node, and scanning for and receiving the broadcast instruction packets addressed to the node at the node. However, the instructions can be otherwise received. However, the transmission condition can be otherwise satisfied. The transmission condition can additionally or alternatively include determining a setting update for one or more beacons within the mesh network (e.g., a request received through an intermediary device), determining the generation of new settings at a remote computing system (e.g., routine updates), determining a need to update a routing table and/or routing path in response to a change in beacon mesh (e.g., in response to receiving an "emergency signal" from one or more beacons, in response to detecting a new BID, in response to receiving updated node telemetry values, etc.), or determining any other suitable need or event.

The transmission condition can optionally be prompted by a user (e.g., at a user device, remote computing system interface, etc.). In one variation, a user prompts updating beacon settings (e.g., operational settings, operational parameters, etc.) at a client application executing on user device (e.g., mobile phone, computer, etc.). In a second variation, a user prompts updating beacon settings through an interface with a remote computing system (e.g., cloud computing system), wherein the updated settings are generated and/or stored at the remote computing system.

S230 can include selectively operating the communication radio in a predetermined mode (e.g., scanning mode, advertising mode, etc.), which functions to enable high-bandwidth beacon data receipt and/or transmission.

For example, when the communication radio is in a scanning mode, it is configured to receive signals at the beacon. In some variations, the beacon can additionally advertise (e.g., broadcast) while scanning. The scanning mode can require higher energy/power to operate in than a default mode (e.g., advertising mode, standby mode, etc.) of the beacons, wherein the beacons are simply broadcasting. The scanning mode can be selectively initiated in response to satisfaction of a transmission condition, wherein the transmission condition requires a data packet to be received at the beacon (e.g., based on routing path), or otherwise initiated.

In a first variation, S230 includes selectively operating the broadcasting radio (e.g., BLE radio) in the transmission mode, which can include ceasing beacon packet broadcasting. In a second variation, S230 includes selectively operating the high-bandwidth radio (e.g., UWB radio) in the transmission mode. In this variation, the beacon can temporarily cease broadcasting radio operation, maintain broadcasting radio operation (e.g., keep broadcasting beacon packets during data transmission), or otherwise operate other radios.

In a third variation, a first beacon (node) receives the packet and floods the packet to the mesh (e.g., when other nodes switch into the scanning mode at a predetermined schedule).

In a fourth variation, a first beacon (e.g., mesh node) of the beacon network receives information (e.g., a data packet and routing path) from the data routing system.

The information is preferably addressed to at least a target node (e.g., tagged with a target node beacon identifier), further preferably addressed to each node in the routing path (e.g., endpoints, hops, etc.), but can additionally or alternatively be addressed to any number of nodes, addressed to a group of nodes, or not addressed.

Routing the packet preferably includes: sequentially switching each node identified in the routing path from an advertising mode, to a scanning mode, and back to the advertising mode, wherein each node transmits and/or receives the information (e.g., data packet and/or routing path) while in the scanning mode. The packet is preferably unicast to the successive node (e.g., identified in the routing path), but can alternatively be multicast to a set of potential successive nodes or otherwise broadcast to the rest of the mesh network.

In some variations, routing the packet includes: at a preceding node identified in the routing path, scanning for a successive packet advertised by the next node (successive node) identified in the routing path; and in response to receiving the successive packet, transmitting the packet to the successive node (e.g., by connecting to the successive node), wherein the successive node subsequently operates as the preceding node. The preceding node can optionally decrement the TTL value in the received packets and/or routing path, maintain a packet cache for forwarded packets, or maintain and/or adjust any other information.

The preceding node can optionally discard the packets, packet cache, routing path, or other information. The information is preferably discarded after the data (packet) is routed to the successive node, but can alternatively be discarded independent of successive node packet receipt. The preceding node can discard the information upon receiving confirmation that the successive node received the packet (e.g., upon receipt of a confirmation packet from the successive node), after a predetermined number of transmission cycles or advertisement cycles (e.g., 1 cycle, 10 cycles, etc.; wherein the cycle number can be specified by the packet, be a default number, or be otherwise determined), after the data routing system determines that the endpoint received the packet (e.g., based on target node or endpoint behavior change; target node packet information; confirmation packet transmission, etc.), or upon occurrence of any other suitable discard event.

Receiving the data packet from the parent node in the data routing path functions to receive the data packet and/or data routing path information. This can optionally include caching the data packet in on-board beacon storage, authenticating the parent node (e.g., as a node that can inject packets into the network), or any other suitable process. The data packet can be received from the parent node using the same or different communication radio as that used to transmit the data packet to the child node. Receiving the data packet can include: establishing a connection with the parent node and receiving the data packet over the connection. The connection is preferably controlled by the parent node, but can alternatively be controlled by the node. In one example, this includes: operating the communication radio in the client mode in response to instruction receipt from the parent node; at the parent node, connecting to the node using the communication radio protocol; and transmitting the data packet from the parent node to the node. In a second example, this includes: operating the communication radio in a master mode in response to instruction receipt from the parent node; scanning for the parent node (e.g., with the communication radio and/or broadcasting radio, wherein the parent node identifier is determined from the received instructions); connecting to the parent node using the communication radio; and retrieving the data packet from the parent node. However, the connection can be otherwise established.

Transmitting the data packet to the child node functions to pass the data packet to the next node in the data routing path. The child node identifier is preferably extracted from the data routing path (e.g., received from the parent node, retrieved from on-board storage, etc.), but can additionally or alternatively be extracted from on-board storage, from the instruction (e.g., received from the parent node), or otherwise determined. Transmitting the data packet to the child node can include: establishing a connection with the child node and receiving the data packet over the connection. The child node connection can be established before data packet receipt and/or parent node connection (e.g., when the child node identifier is received as part of the instruction, when the transmission is scheduled and the child node identifier is stored on-board the beacon, etc.), be established after data packet receipt and/or parent node connection (e.g., wherein the child node identifier is received from the parent node, extracted from the data routing path received with the data packet, etc.), or be established at any other suitable time. In a first variation, the same radio is used to receive and send the data packet. The radio can be concurrently connected to both the parent and child nodes (e.g., wherein the node radio is operating in the master or server mode); serially connected to the parent, then to the child node (e.g., wherein the parent node can terminate the connection after a receipt confirmation from the node, the node can operate the communication radio in a master or server mode and search for and connect to the child node); or be connected to any suitable set of nodes at any suitable time. In a second variation, different radios and/or channels are used to receive and send the data packet. The data packet can be periodically re-transmitted until a receipt confirmation is received from the child node, until a threshold number of attempts are made, or until any other suitable condition is met. However, the data packet can be otherwise transmitted to the child node.

Selectively operating the radio in the default mode functions to conserve node power. This is preferably automatically performed after the receipt confirmation is received from the child node, but can be performed at any other suitable time or not performed at all. In a default mode (e.g., low energy mode), the radio preferably only broadcasts, but can alternatively perform any suitable functionality. The radio can broadcast continuously, at a predetermined interval of time (e.g., every three minutes), based on sensor data (e.g., when light is above a threshold based on an optical sensor, based on motion sensor data, etc.), broadcast according to the node settings, or at any other suitable time(s).

Routing the data can optionally include verifying data packet transfer. In a first variation, this includes the parent node receiving a receipt confirmation from the child node. In a second variation, this includes: receiving a beacon packet from a node that should have received the data packet, and verifying that the beacon received the data packet based on packet information (e.g., checking the firmware version number). However, the data packet transfer can be otherwise verified.

4.6 Additional Steps

The method 200 can optionally include any number of additional steps, such as, but not limited to, those described below.

The method 200 can include iteratively refining the path-determination method (e.g., to accommodate for wireless interference, such as EMI topology, specific to the physical space; to refine the object location determination methods; etc.). Refining the path-determination method can include: adjusting parameter weights, selecting a new path determination method, or otherwise refining the method. The path determination method can be refined periodically, after each data packet is transmitted, or at any other suitable time. In a first variation, this can include refining the path determination methods based on packet receipt data from the endpoint (e.g., receipt time, number of lost packets, etc.), the data routing path for the respective data packet (e.g., retrieved from the intervening nodes, from the data routing system, etc.), the mesh operation parameters for the data transmission time, and/or any other suitable information. The path determination methods can be refined (e.g., generated, calculated, etc.) using supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), or otherwise determined. However, the path determination method can be otherwise optimized (e.g., using RF mapping techniques, using historic paths of object travel through the physical monitored space, etc.). In some variations, the path-determination method is refined in response to detecting a change in the mesh (e.g., beacon added, beacon removed, beacon unresponsive, threshold change in beacon telemetry values, etc.) as described previously.

The method 200 can optionally include setting up the mesh network. This can include: physically arranging the mesh nodes within the space and determining the mesh topology. The physical arrangement of the mesh nodes within the space is preferably defined by a user, but can be defined based on a physical map of the space (e.g., optimal node positions determined based on estimated foot traffic paths, estimated EMI topology, etc.), or be otherwise defined. The mesh topology can include the node physical locations (e.g., x, y, z, orientation angle, matrix distance to other beacons, etc.), the traffic for each node (e.g., current, anticipated; determined based on the determined data routing paths, etc.), or any other suitable information. The mesh topology can be represented as a random geometric graph, physical map, or otherwise represented.

The method 200 can optionally include sending one or more notifications to a user device (e.g., intermediary device). The notifications can be related to any or all of: beacon parameters, such as power (e.g., battery needs to be replaced, battery will die in next 2 weeks, etc.), status (e.g., beacon has fallen off wall, additional beacon has been added), targeted content based on user device location (e.g., as determined in step above), or any other information.

The method 200 can optionally include verifying data transmission to a target node, which can include: at the remote computing system, receiving one or more advertisement packets broadcast by the target node and determining that the target node is operating according to the operation parameter settings (within the data packet) based the advertisement packets. In one variation, data packets are received at the remote computing system through one or more intermediary devices. However, data transmission to the target node can be otherwise verified.

The method 200 can optionally include determining a physical location for the intermediary device, which can function to locate the intermediary device with high precision. The intermediary device is preferably located using the methods described in U.S. application Ser. No. 15/921,844 filed 15 Mar. 2018, U.S. application Ser. No. 15/436,564 filed 17 Feb. 2017, U.S. application Ser. No. 15/466,680 filed 22 Mar. 2017, and/or Ser. No. 15/900,171 filed 20 Feb. 2018, each of which are incorporated herein in their entireties by this reference, but can alternatively or additionally be located in any other suitable manner. In one variation, determining a physical location for the intermediary device includes: receiving a set of advertisement packets broadcast by a set of beacons (nodes), each with a known physical location (e.g., within a predetermined time window, such as a broadcast window); and determining the device location based on the known physical locations of the beacons associated with the advertisement packets (e.g., associated with the beacon identifiers within the advertisement packets) and, optionally, the respective packet RSSIs, the beacon telemetry, or other factor. The device location can be determined by the device, a third party system, the data routing system, a remote computing system, or any suitable system. The device location can be determined using trilateration, triangulation, or any suitable method.

4.7 Variations

In a first variation, the method 200 includes generating a data routing table through flooding and sending data to the data routing system. In a specific example, the routing table is generated once (e.g., wherein the routing table can include static routing paths) and then stored in a remote server (e.g., cloud, data routing system, etc.). The routing table is then used to route data (e.g., updated settings/operational parameters) throughout a mesh of individually-addressed beacons, wherein the routing paths can be transmitted to the mesh (e.g., each mesh node in the routing path) or otherwise used. Data routing through the mesh is preferably proactive, but can alternatively be reactive.

In a second variation, the method 200 includes determining a location of an intermediary device by broadcasting BIDs from a set of beacons, determining a first beacon based on proximity to the intermediary device, generating a routing path, transmitting the routing path along with a data packet for the first beacon from a remote computing system (e.g., data routing system) to the intermediary device to the first beacon, transmitting the data packet and routing path to any number of intermediary beacons including finally a target beacon, and verifying transfer of data packet to target beacon.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for routing data within a local node network including a plurality of individually-addressed Bluetooth nodes, the method comprising:
   at a remote computing system physically remote from the node network:
      determining a battery level of each node within the node network;
      generating a routing table for the node network based on the node battery levels;
      wirelessly connecting to a first node of the node network, wherein the first node comprises a cellular hardware module;
      after wirelessly connecting to the first node, determining:
         data addressed to a target node of the node network; and
         an optimal routing path from the first node to the target node, the optimal routing path determined based on the routing table;
      transmitting the data and the optimal routing path to the first node; and
   at the first node, receiving the data and the optimal routing path from the remote computing system; and
   routing the data from the first node to the target node according to the optimal routing path, using Bluetooth radios of nodes identified within the optimal routing path.

2. The method of claim 1, wherein each node of the plurality of nodes is operable between an advertising mode and a scanning mode, wherein:
   operating in the advertising mode comprises broadcasting a respective data packet at a predetermined frequency; and
   operating in the scanning mode comprises operating a Bluetooth radio of the node in a transmission mode.

3. The method claim 1, wherein the optimal routing path comprises:
   a set of intermediate nodes, wherein each intermediate node of the set is associated with a respective next node and a respective preceding node, the respective next node different from the respective preceding node;
   the first node, wherein the first node is a preceding node of an initial intermediate node of the set of intermediate nodes; and the target node, wherein the target node is a next node of a final intermediate node of the set of intermediate nodes, and wherein the target node is affixed to an endpoint.

4. The method of claim 3, wherein routing the data from the first node to the target node comprises, sequentially, at each intermediate node:
   switching to a scanning mode from an advertising mode;
   while in the scanning mode, receiving the data and the optimal routing path from the respective preceding node of the intermediate node;
   upon receipt of the data and the optimal routing path, forwarding the data and the optimal routing path to the respective next node of the intermediate node; and
   after forwarding the data and the optimal routing path, switching to the advertising mode.

5. The method of claim 4, wherein the advertising mode comprises broadcasting a respective data packet at a predetermined frequency.

6. The method of claim 4, wherein the scanning mode comprises operating the Bluetooth radios in a transmission mode, wherein the Bluetooth radios are UWB radios.

7. The method of claim 3, wherein the optimal routing path comprises all hops between the first node and the target node.

8. The method of claim 3, further comprising:
   at an intermediate node of the set, broadcasting a plurality of data packets, each data packet of the plurality comprising a respective node identifier associated with the intermediate node;
   at the first node,
      receiving a data packet of the plurality from the intermediate node; and
      in response to receiving the data packet, transmitting the data packet to the remote computing system;
   at the remote computing system:
      receiving the data packet from the first node;
      in response to receiving the data packet, determining the data and the optimal routing path; and
      in response to determining the data and the optimal routing path, transmitting the data and the optimal routing path to the first node.

9. The method of claim 3, wherein the data comprises operation parameter settings for the plurality of nodes, the method further comprising, at the first node:
   receiving the operation parameter settings and the optimal routing path from the remote computing system; and
   operating according to the operation parameter settings.

10. The method of claim 9, further comprising:
    at a first node, forwarding the operation parameter settings and the optimal routing path from the first node to the initial intermediate node; and
    at the initial intermediate node:
       receiving the operation parameter settings; and
       in response to receiving the operation parameter settings, operating according to the operation parameter settings.

11. The method of claim 9, wherein operating according to the operation parameter settings comprises broadcasting at a predetermined frequency.

12. The method of claim 1, wherein the first node comprises a GPS module, the method further comprising, at the first node:
    determining location information using the GPS module; and
    transmitting the location information to the remote computing system.

13. The method of claim 12, wherein transmitting location information comprises:
    in response to determining the location information, storing the location information in memory;
    periodically, at a predetermined frequency, sending all location information stored in memory to the remote computing system; and
    in response to sending the location information, erasing the location information.

14. The method of claim 1, further comprising, at the remote computing system:
    receiving, from the first node:
       a first data packet associated with the first node; and
       a second data packet associated with a second node, wherein the second node is different from the first node and the target node; and
    based on the first data packet, determining a first location of the first node;
    based on the second data packet, determining a second location of the second node; and
    based on the first location and the second location, determining a target location of the target node.

15. The method of claim 1, further comprising:
    at the remote computing system, transmitting:
       a request for operation data associated with the target node; and
       the optimal routing path; and
    at the target node:
       receiving the request and the optimal routing path; and
       after receiving the request and the optimal routing path, transmitting the operation data and the optimal routing path to the remote computing system, the operation data comprising at least one of: operation parameters and beacon data.

16. The method of claim 15, wherein the operation data further comprises the battery level of the target node.

17. The method of claim 1, further comprising, at the remote computing system:
    after determining the battery level of each node, determining an updated battery level of each node; and
    after determining the updated battery level of each node, generating an updated routing table for the node network based on the updated battery level of each node.

* * * * *

UNITED STATES PATENT AND TRADEMARK OFFICE
CERTIFICATE OF CORRECTION

| | | |
|---|---|---|
| PATENT NO. | : 10,524,083 B2 | Page 1 of 1 |
| APPLICATION NO. | : 16/152254 | |
| DATED | : December 31, 2019 | |
| INVENTOR(S) | : Jakub Krzych and Lukasz Kostka | |

It is certified that error appears in the above-identified patent and that said Letters Patent is hereby corrected as shown below:

In the Claims

Column 24, Line 59, In Claim 3, after "method", insert --of--

Signed and Sealed this
Twenty-first Day of March, 2023

*Katherine Kelly Vidal*

Katherine Kelly Vidal
*Director of the United States Patent and Trademark Office*